(12) United States Patent
Kitayama et al.

(10) Patent No.: US 6,790,020 B2
(45) Date of Patent: Sep. 14, 2004

(54) SYSTEM FOR PRODUCING FOAMED ARTICLE, A MOLTEN RESIN PREPARING APPARATUS AND A MOLDING APPARATUS FOR USE IN FOAMED ARTICLE PRODUCTION SYSTEM

(75) Inventors: Takeo Kitayama, New York, NY (US); Nobuhiro Usui, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 32 days.

(21) Appl. No.: 10/012,037

(22) Filed: Dec. 11, 2001

(65) Prior Publication Data

US 2002/0091168 A1 Jul. 11, 2002

(30) Foreign Application Priority Data

Dec. 12, 2000 (JP) .......................... 2000-376890
Dec. 12, 2000 (JP) .......................... 2000-376891
Dec. 15, 2000 (JP) .......................... 2000-381506

(51) Int. Cl.$^7$ ............................................ B29C 44/08
(52) U.S. Cl. .................. 425/4 R; 425/416; 425/817 R; 425/583; 425/587; 425/589; 425/208; 425/162; 425/150; 366/79; 261/83; 261/DIG. 26
(58) Field of Search ............................... 425/4 R, 416, 425/817 R, 547, 583, 585, 587, 208, 162, 589, 549, 578, 150; 261/83, DIG. 26; 366/79, 88, 89

(56) References Cited

U.S. PATENT DOCUMENTS

| | | | | |
|---|---|---|---|---|
| 4,145,176 A | * | 3/1979 | Nelson | 425/405.1 |
| 4,268,240 A | * | 5/1981 | Rees et al. | 425/548 |
| 4,390,332 A | * | 6/1983 | Hendry | 425/4 R |
| 5,098,267 A | * | 3/1992 | Cheng | 425/4 R |
| 5,514,310 A | * | 5/1996 | Sander | 264/50 |
| 5,997,781 A | * | 12/1999 | Nishikawa et al. | 264/45.1 |

* cited by examiner

Primary Examiner—Robert Davis
Assistant Examiner—Joseph S. Del Sole
(74) Attorney, Agent, or Firm—Fitch, Even, Tabin & Flannery

(57) ABSTRACT

Disclosed is a system in which carbon dioxide is supplied to a pressure chamber of a molten resin preparing apparatus which has established a certain temperature environment to diffuse the carbon dioxide in a material synthetic resin in a molten state. After turning the material synthetic resin into a gas-dissolving-resin in the pressure chamber, the gas-dissolving-resin is supplied to a mold space of a molding apparatus for compression molding. The pressure inside the mold space is quickly lowered by raising an upper mold of the molding apparatus quickly, whereby a foamed article is produced from the gas-dissolving-resin in the mold space.

20 Claims, 16 Drawing Sheets

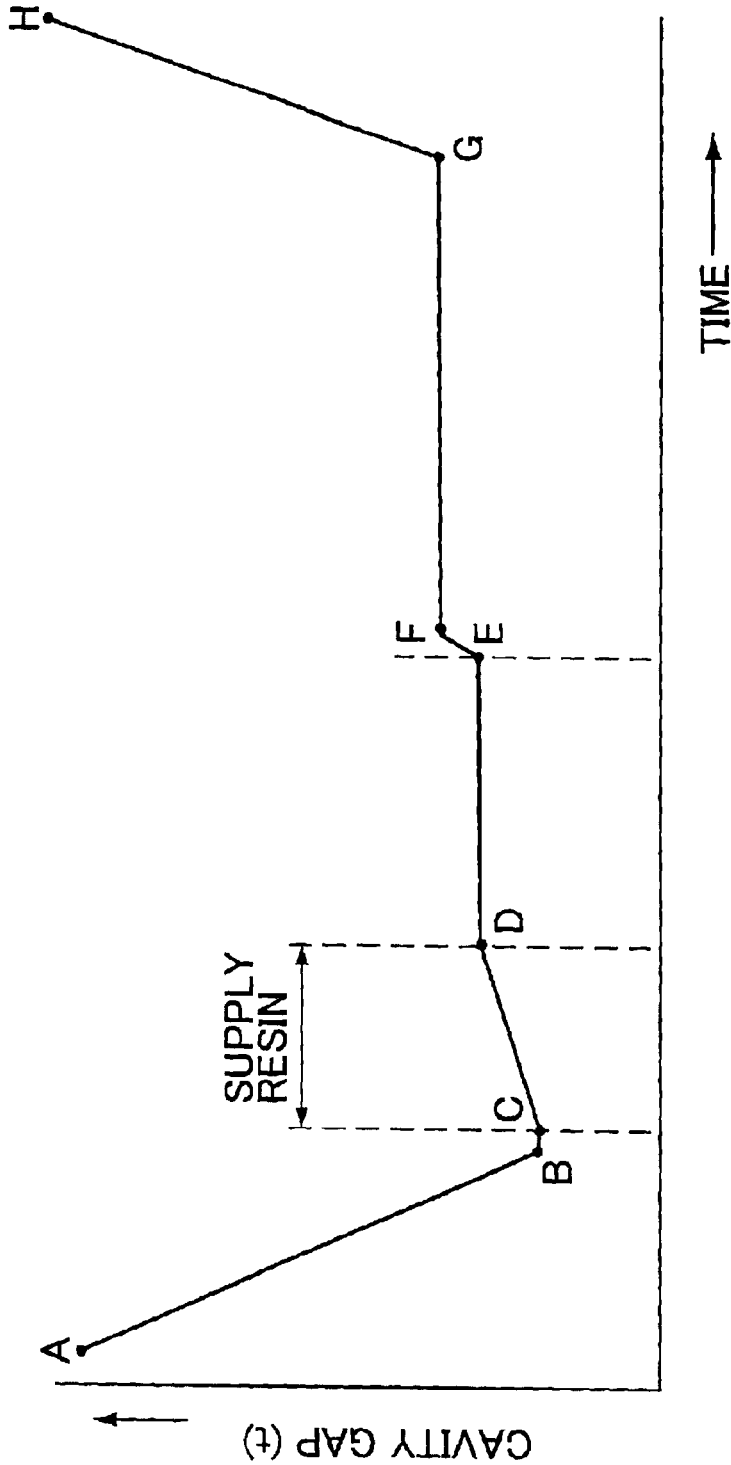

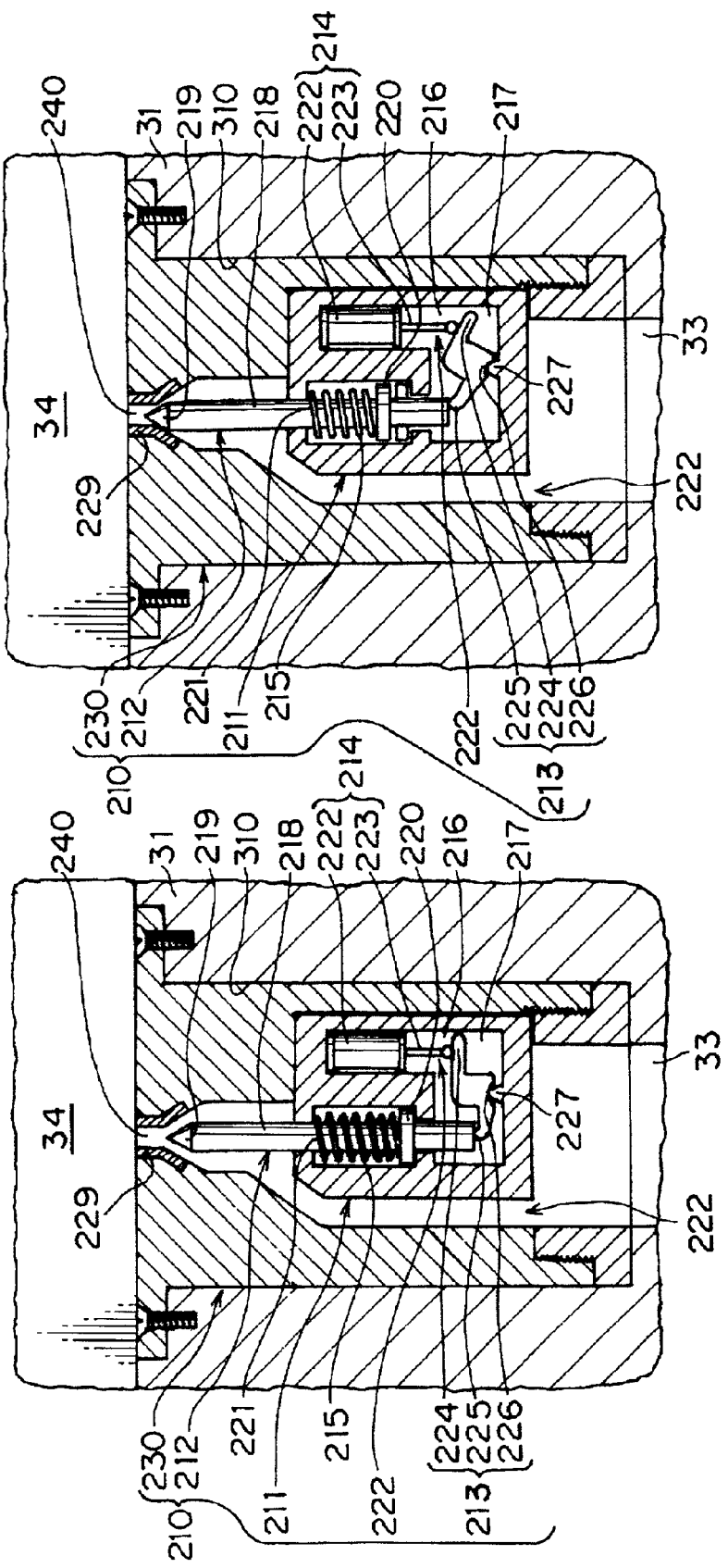
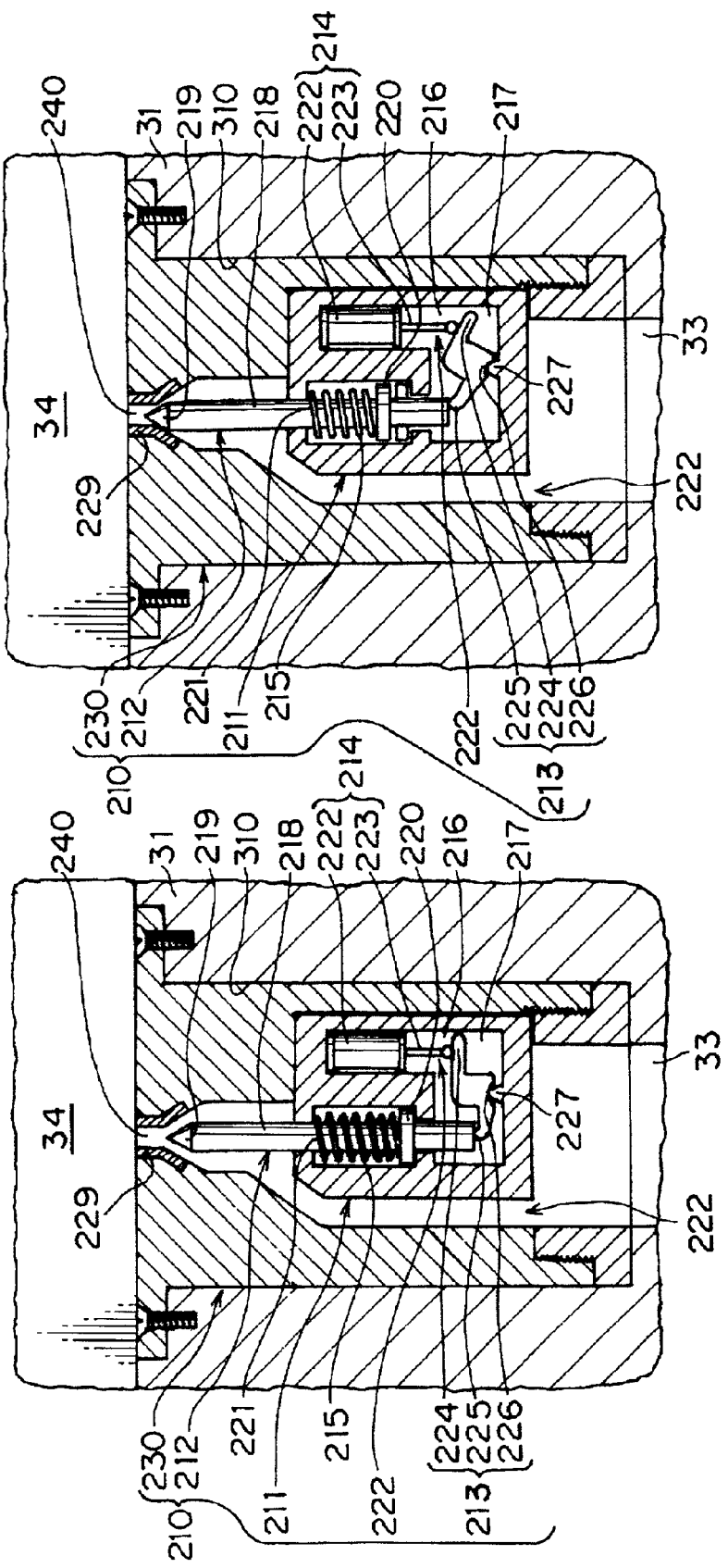
FIG. 14A
FIG. 14B

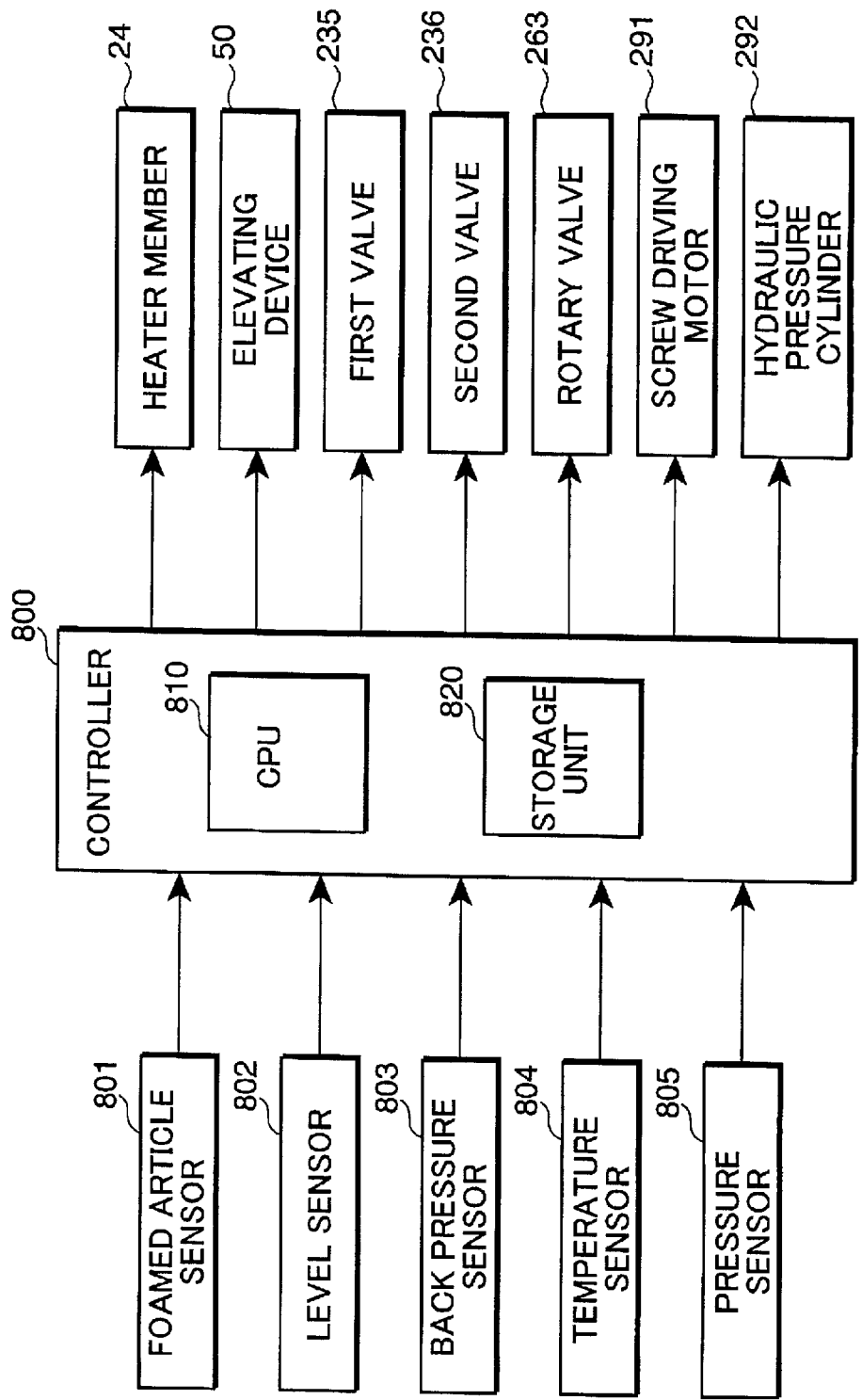

SYSTEM FOR PRODUCING FOAMED ARTICLE, A MOLTEN RESIN PREPARING APPARATUS AND A MOLDING APPARATUS FOR USE IN FOAMED ARTICLE PRODUCTION SYSTEM

BACKGROUND OF THE INVENTION

1. Field of the Invention

This invention relates to a system for producing a foamed article, in particular to a system for producing a foamed article having a great number of very small cells from thermoplastic synthetic resin having nucleated cells, and a molten resin preparing apparatus and a molding apparatus for use in such foamed article production system.

2. Description of the Related Art

There has been known a system for producing a foamed article by molding a gas-dissolving-resin in a molten state as a material into a mold to produce a variety of molded articles, as disclosed in, e.g., Japanese Patent No. 2625576 (corresponding to U.S. Pat. No. 5,158,986). In the system, carbon dioxide is introduced in a molten thermoplastic synthetic resin to cause the carbon dioxide into a supercritical state under conditions greater than critical temperature and pressure to prepare a material for a foamed article, namely gas-dissolving-resin, and the thus prepared material is supplied to a mold to produce a molded article.

Since the above system does not use a blowing agent (chemical substance) which resultantly forms cells in a molded article, the diameter of cell in a resultant molded article is extremely small in the range from 0.1 to 10 $\mu$m. The diameter of cells in a foamed article produced from the above-mentioned material is as small as $\frac{1}{10}$ to $\frac{1}{100}$ compared to that of a foamed article produced from material having blowing agent. The thus produced foamed article is light in weight without impaired physical properties of synthetic resin.

The aforementioned system adopts a so-called injection molding technique in which a material for a foamed article is injected by an injecting apparatus into a mold space of a mold which is a jointed member of an upper die and a lower die. The mold space of a certain capacity is defined by the upper die and the lower die.

In the above system employing the injection molding technique, when material having nucleated cells (hereinafter, referred to as "cell nucleators") is supplied into the mold space of the mold, a phase separation of carbon dioxide making cell nucleators occurs owing to a lower pressure in the mold space of the mold. Such cell nucleators grow into microcells as time lapses. Since the cell diameter are in an inversely proportional with the pressure lowering rate, it is required to regulate the pressure lowering rate in the mold to secure cells of extremely small diameter. In view of this, the conventional system is provided with a pressure regulator for giving a counter-pressure to the mold space to regulate the pressure lowering rate in the mold.

The pressure regulator comprises a gas cylinder containing carbon dioxide therein, a gas supply pipe connected to the gas cylinder and the mold space of the mold, and an openable/closable valve provided at the gas supply pipe. The pressure regulator regulates the pressure in the mold space of the mold to properly set a pressure lowering rate in the mold by controllably opening the valve.

Providing the pressure regulator in the aforementioned manner makes it difficult to manipulate the valve in an attempt to set the pressure lowering rate properly, thereby obstructing production of molded articles having uniform quality, also raising the production cost.

SUMMARY OF THE INVENTION

It is an object of the present invention to provide a system for producing a foamed article which is free from the problems residing in the prior art.

According to an aspect of the invention, a preparing apparatus prepares a molten gas-dissolving-resin having a great number of cell nucleators by diffusing a gas in a synthetic resin in a molten state under conditions of a predetermined temperature and a predetermined pressure. A molding apparatus foams and molds the gas-dissolving-resin supplied from the preparing apparatus into a foamed article having a great number of cells, the molding apparatus including at least two mold members which define a mold space and are movable relative to each other.

These and other objects, features and advantages of the present invention will become more apparent upon a reading of the following detailed description and accompanying drawing.

BRIEF DESCRIPTION OF THE DRAWINGS

FIGS. 2A to 2D are sectional views of a molding apparatus of the system to show a first sequence of operations of the molding apparatus, wherein FIG. 2A shows a state that an upper mold is raised to an uppermost position, and the mold space of the molding apparatus is opened, FIG. 2B shows a state that the upper mold is lowered to a lowermost position, and the mold space has a minimum capacity, FIG. 2C shows a state that the upper mold is being raised as a gas-dissolving-resin is supplied into the mold space, FIG. 2D shows a state that the upper mold is further raised as the gas-dissolving-resin is foamed;

FIG. 3 is a graph showing a mold space gap between a bottom surface of a lower mold and a top surface of the upper mold in the first sequence of operations shown in FIG. 2A to 2D;

FIGS. 4A to 4F are sectional views of the molding apparatus of the system to show a second sequence of operation of the molding apparatus, wherein FIG. 4A shows a state that the upper mold is raised to an uppermost position, and a covering member is placed over the lower mold in a state that the mold space is opened, FIG. 4B shows a state that the upper mold is lowered to be mounted on the lower mold, and the mold space is defined therebetween, FIG. 4C shows a state that a gas-dissolving-resin is supplied into the mold space, FIG. 4D shows a state that the upper mold is further lowered, and the mold space has a minimum capacity, FIG. 4E shows a state that the upper mold is raised at a greater speed, and the mold space is rendered into a depressurized state, and FIG. 4F shows a state that the upper mold is returned to the uppermost position, and the mold space is opened;

FIGS. 8A and 8B are sectional views of a shut-off valve unit provided in the system shown in FIG. 7, wherein FIG. 8A shows a state that the valve unit is opened and FIG. 8B shows a state that the valve unit is closed;

FIGS. 13A and 13B are sectional side views of an open/close valve unit provided in the foamed article producing system shown in FIG. 10, wherein FIG. 13A shows a state that the valve unit is opened and FIG. 13B shows a state that the valve unit is closed;

FIGS. 14A and 14B are sectional views of a shut-off valve unit provided in the foamed article producing system shown in FIG. 10, wherein FIG. 14A shows a state that the valve unit is opened and FIG. 14B shows a state that the valve unit is closed;

FIG. 15 is a block diagram showing a control system of the foamed article producing system.

DETAILED DESCRIPTION OF THE PREFERRED EMBODIMENTS OF THE INVENTION

Figure 1:
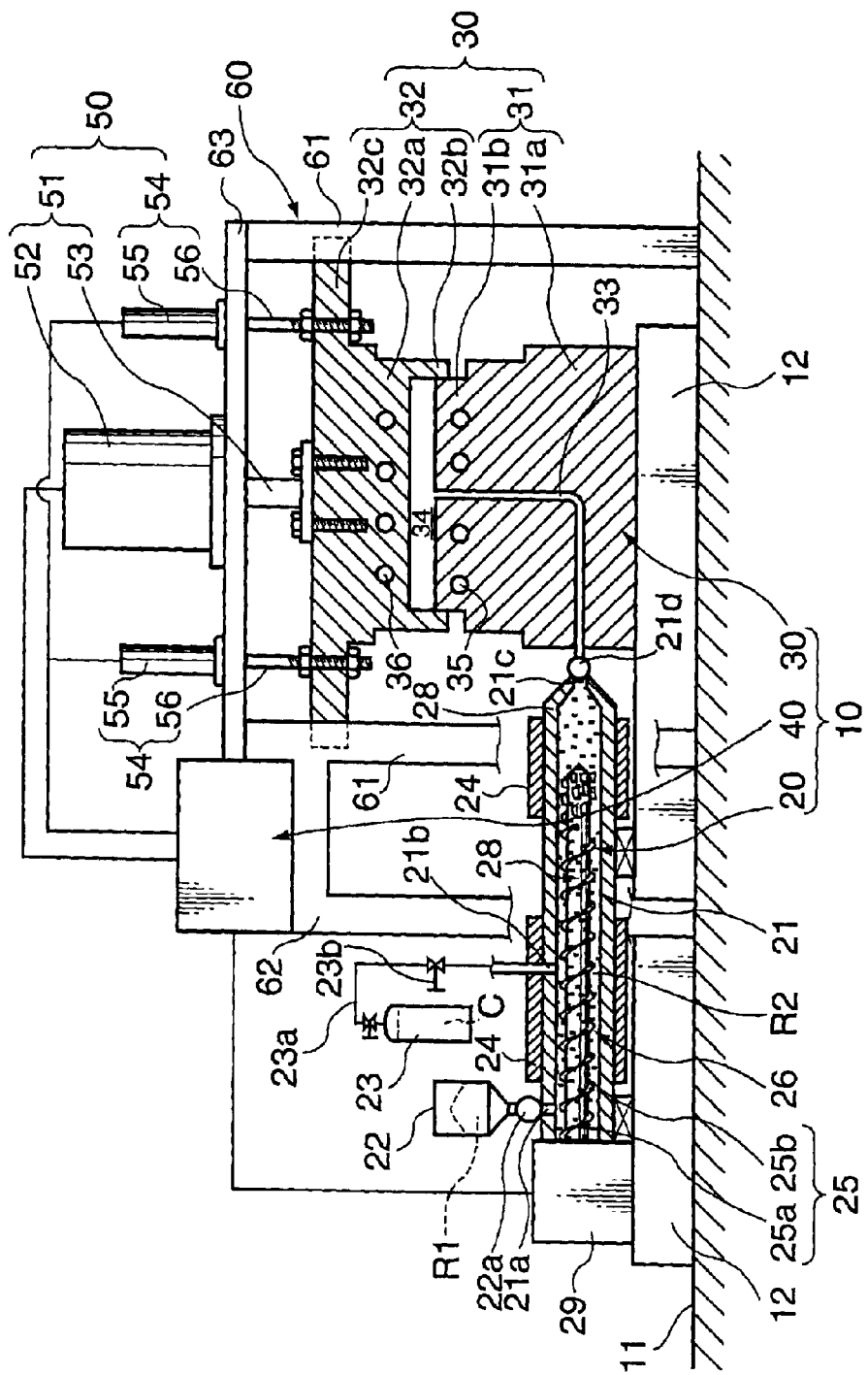
FIG. 1 is a sectional side view of a foamed article producing system in accordance with a first embodiment of the invention.

Referring to FIG. 1 showing a foamed article producing system in accordance with a first embodiment of the invention, a foamed article producing system 10 includes a molten resin preparing apparatus 20 for preparing a resin in which a gas is dissolved (hereinafter, referred to as "gas-dissolving-resin") by diffusing a gas for nucleating cells in a material synthetic resin in a molten state, a molding apparatus 30 for subjecting the gas-dissolving-resin supplied from the molten resin preparing apparatus 20 to a compression molding, and a hydraulic unit 40 for applying a hydraulic pressure to each of the molten resin preparing apparatus 20 and the molding apparatus 30.

The molten resin preparing apparatus 20 includes a extrusion cylinder 21 which is mounted on a base block 12 of a reinforced concrete installed on a floor 11, a raw material hopper 22 which is provided at a base end (left side in FIG. 1) of the extrusion cylinder 21, a gas cylinder 23 which is provided generally in the middle of an axial length of the gas cylinder 23 and close to the extrusion cylinder 21 to supply carbon dioxide, a heater member 24 which is wound around an outer circumference of the extrusion cylinder 21, and an mixing screw 25 which is provided inside the extrusion cylinder 21.

A pressure chamber 26 extending from the base end of the extrusion cylinder 21 toward a lead end thereof is defined inside the extrusion cylinder 21. The mixing screw 25 is mounted inside the pressure chamber 26. Carbon dioxide C is mixed with a synthetic resin R1 which includes a thermoplastic synthetic resin as a raw material to prepare a gas-dissolving-resin R2, and the thus prepared gas-dissolving-resin R2 is supplied toward the molding apparatus 30 through a resin outlet port 21c which is formed at a downstream end of the extrusion cylinder 21 with respect to a material supplying direction by rotating the mixing screw 25 about an axis thereof. A resin inlet port 21a for introducing the raw material synthetic resin R1 into the pressure chamber 26 is formed at a base end of the extrusion cylinder 21. A gas inlet port 21b for introducing the carbon dioxide C is formed in the extrusion cylinder 21 at a right side of the resin inlet port 21a.

The raw material hopper 22 is mounted right above the resin inlet port 21a of the extrusion cylinder 21. The raw material synthetic resin R1 in a granular or powdery state is loaded in the hopper 22. The raw material synthetic resin R1 includes any type of thermoplastic synthetic resin which is generally used in compression molding, injection molding, extrusion die, etc. For example, the raw material synthetic resin R1 includes general thermoplastic resins such as polyolefine resins including polyethylene and propylene; polystyrenes; polyamides such as nylon; polyvinylchlorides; polycarbonates; acrylic resins; thermoplastic elastomers such as acrylonitrile-styrene-butadiene copolymer, styrene-butadiene block copolymer, compounds of ethylene-propylene methylene linkage (EPM), and compounds of ethylene-propylene-diene methylene linkage (EPDM); a mixture thereof; or a polymer alloy using the same.

A raw material supplying pipe is provided between a bottom portion of the hopper 22 and the resin inlet port 21a. A rotary valve 22a is provided at the raw material supplying pipe. Manipulating the rotary valve 22a to start supplying the material and suspend its supplying operation controllably introduces the synthetic resin R1 into the hopper 22 and suspends its supplying operation. Closing a shut-off valve 21a which is provided at the resin inlet port 21c closes the pressure chamber 26.

The gas cylinder 23 is adapted to store carbon dioxide which has been compressed at a certain high pressure therein. A gas supplying pipe 23a is provided between the gas cylinder 23 and the gas inlet port 21b of the extrusion cylinder 21. An openable/closable valve 23b is provided at the gas supplying pipe 23a. Openably and closably manipulating the valve 23b enables to supply the carbon dioxide C into the pressure chamber 26 and suspends its supplying operation.

The heater member 24 is a conductive heater in this embodiment. The heater member 24 has an annular shape and is wound around the extrusion cylinder 21. With this arrangement, the raw material synthetic resin R1 and the gas-dissolving-resin R2 mixed with the carbon dioxide C which have been supplied into the pressure chamber 26 are uniformly heated from the outer circumferential surface of the extrusion cylinder 21.

The mixing screw 25 is rotatably mounted about an axis thereof on the base end (left side in FIG. 1) of the extrusion cylinder 21. The mixing screw 25 is provided inside the pressure chamber 26 concentrically with the extrusion cylinder 21 in a sealed state. The mixing screw 25 includes a screw shaft 25a, and a spiral blade 25b which is formed spirally along an outer circumferential surface of the screw shaft 25a. The mixing screw 25 is driven by a hydraulic motor mounted in a hydraulic driving mechanism 29 which is installed on a left side of the extrusion cylinder 21 in FIG. 1 on the base block 12.

Supplying the synthetic resin R1 from the hopper 22 and the carbon dioxide C from the gas cylinder 23 respectively into the pressure chamber 26 in a state that the inside of the pressure chamber 26 is heated at a specified temperature by power supply to the heater member 24 while rotating the mixing screw 25 about an axis thereof enables to set the inside of the pressure chamber 26 to an environment of a specified high temperature and high pressure. Thereby, the granular synthetic resin R1 is dissolved into a fluidized state, and the carbon dioxide C is dissolved in the fluidized synthetic resin R1, whereby the gas-dissolving-resin R2 is obtained.

The temperature and pressure of the carbon dioxide C in the pressure chamber 26 are each kept at a predetermined value. Thereby, the carbon dioxide C is rendered into a so-called supercritical state under which carbon dioxide exhibits properties inherent to an interim state between gas phase and liquid phase. Thus, the carbon dioxide C in a supercritical state is desirably dissolved in the synthetic resin R1.

This invention is not limited to the aforementioned embodiment in which gas for forming cells in resultant molded articles is rendered into a supercritical state. For instance, in the case where the raw material synthetic resin R1 is propylene (PP), the gas-dissolving-resin R2 is obtainable even if carbon dioxide does not attain a supercritical state, as far as a temperature environment that enables to dissolve propylene in a predetermined pressurized condition can be established. This is because carbon dioxide can be dissolved in propylene by utilizing a chemical mechanism that a gas is dissolved in a liquid.

Thus, placing the molten gas-dissolving-resin R2 under a drastically depressurized condition enables to form cell nucleators uniformly in the molten resin due to phase separation of the carbon dioxide C which has been dissolved in the gas-dissolving-resin R2. The thus formed cell nucleators will grow to cells each having a specified diameter in a foamed article. When the resin R2 is cooled at a stage when the cell nucleators grow to have the specified diameter, a supermicrocellular foamed article is produced.

As shown in FIGS. 2A to 2D, the molding apparatus 30 includes a lower mold (male mold) 31 which is installed on the base block 12 and an upper mold (female mold) 32 which is arranged opposingly above the lower mold 31.

The lower mold 31 includes a lower mold base member 31a of a two-step solid cylindrical or prismatic shape made of a metallic material, and a cylindrical or prismatic main body 31b which concentrically and upwardly projects from a top surface of the base member 31a. The lower mold 31 is formed with a resin supplying channel 33 which extends from a center position on an upper surface of the lower mold main body 31b downwardly toward a sealing valve 21d of the extrusion cylinder 21. The gas-dissolving-resin R2 which has been extruded out of the pressure chamber 26 via the sealing valve 21d by rotation of the mixing screw 25 is supplied to the upper surface of the lower mold main body 31b through the resin supplying channel 33.

The upper mold 32 includes a base member 32a which is slightly larger than the lower mold main body 31b in its planar dimension, a main body 32b which extends downwardly from the upper mold base member 32a, and a flange portion 32c which protrudes radially outwardly from an upper rim of the upper mold base member 32a.

The upper mold main body 32b is configured into a cylindrical shape so as to be slidably mounted on the lower mold main body 31b. In this arrangement, when the upper mold main body 32b is mounted on the lower mold main body 31b, a mold space 34 is defined by the upper surface of the lower mold main body 31b and a top surface of the upper mold main body 32b to foam the gas-dissolving-resin R2 which has been supplied to the mold space 34 from the preparing apparatus 20 via the resin supplying channel 33 so as to produce a foamed article. The upper mold 32 is movable upward by driving an elevating device (moving mechanism) 50 which is provided above the upper mold 32. When the upper mold 32 is moved upward relative to the lower mold 31, the mold space 34 is exposed outside. A vertical dimension of the mold space 34 is adjustable in a state that the upper mold main body 32b is mounted on the lower mold main body 31b.

Front and rear ends (left and right ends in FIG. 1) of the flange portion 32c are slidably mounted respectively between pairs of main posts 61, 61 each provided at front and rear sides of the system 10. Upward and downward movement of the upper mold 32 is secured by vertically sliding the upper mold 32 along the pairs of main posts 61, 61.

The molding apparatus 30 includes a plurality of lower mold cooling water channels 35 each extending through the lower mold main body 31b, and an upper mold cooling water channel 36 extending through the upper mold main body 32b. After forming a foamed article R3 in the mold space 34, the foamed article R3 is cooled by heat exchange by the cooling water running through the cooling water channels 35, 36.

The elevating device 50 is supported on a support frame member 60 which is built on the floor 11 in such a manner as to bridge over part of the preparing apparatus 20 and the molding apparatus 30. The support frame member 60 includes four upright main posts 61 which are provided on four corners of the molding apparatus 30 (in FIG. 1, two main posts 61 are shown), two inverted L-shaped upright posts 62 which are provided in a state that the posts 62 are bridged over the extrusion cylinder 21 at a position leftwardly from the left-side two main posts 61 in FIG. 1 (only one left-side main post 61 is shown in FIG. 1), and a top plate 63 supported on the four main posts 61.

The elevating device 50 includes a main cylinder unit 51 mounted at a center of the top plate 63, and a pair of sub cylinder units 54 mounted at sideways positions respectively with respect to the main cylinder unit 51 on the top plate 63. Providing the main cylinder unit 51 and the sub cylinder units 54 enables to move the upper mold 32 upward and downward in a stable manner.

The main cylinder unit 51 includes a main cylinder 52 mounted on the top plate 63, and a main piston rod 53 which is mounted on the main cylinder 52 and suspends downwardly through the top plate 63. Each of the sub cylinder units 54 includes a sub cylinder 55 mounted on the top plate 63, and a sub piston rod 56 which is mounted on the sub cylinder 55 and suspends downwardly through the top plate 63.

A lower end of the sub piston rod 56 is fixed at a center portion on the upper surface of the upper mold base member 32a by a bolt and fastening means. A lower end of each of the sub piston rods 56 is fastened by a nut in a state that the lower end is exposed through the flange portion 32c of the upper mold 32. With this arrangement, the main piston rod 53 and the sub piston rods 56 are securely fastened to the upper mold 32. The elevating device 50 thus constructed is driven by hydraulic oil supplied from the hydraulic unit 40.

The hydraulic unit 40 is provided with an oil reservoir for storing hydraulic oil, an oil pump for sucking and ejecting the hydraulic oil in and out of the oil reservoir, and hydraulic equipment (not shown) including an electromagnetic valve for switching over flowing channels of the hydraulic oil according to needs. When the system 10 is activated, various components of the hydraulic equipment perform predetermined operations in accordance with a control signal based on pre-stored program data from a control device (not shown) in such a manner that the hydraulic driving mechanism 29 and the elevating device 50 are driven synchronously in accordance with ejection of hydraulic oil as timed with an operation schedule from the hydraulic unit 40. Thereby, the gas-dissolving-resin R2 injected into the mold space 34 is formed into a foamed article by the molding apparatus 30.

Figure 2A:
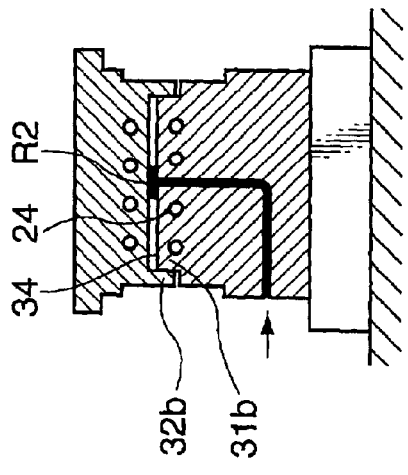
Figure 2B:
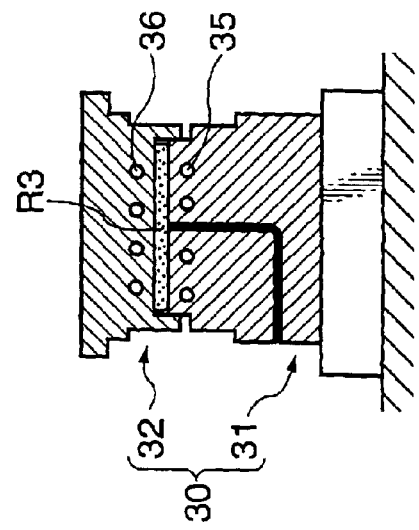
Figure 2C:
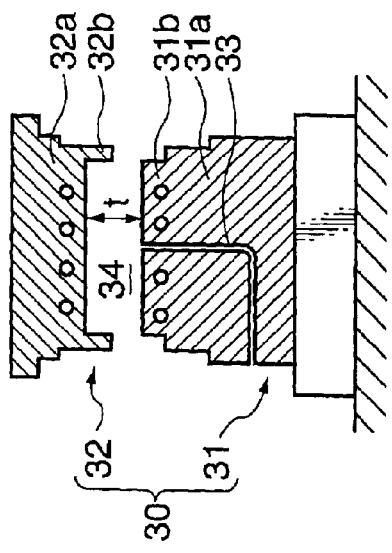
Figure 2D:
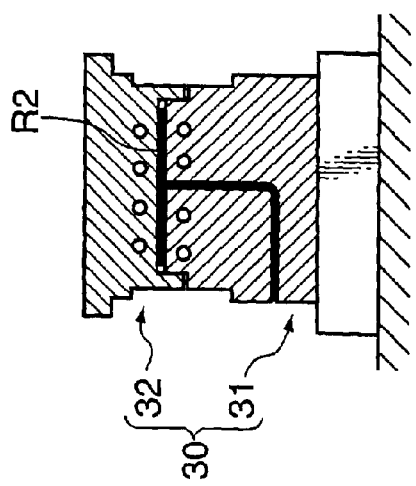

Hereinafter, a first method for producing a foamed article with use of the system 10 in the first embodiment is described with reference to FIGS. 2A to 3. FIGS. 2A to 2D are sectional views of the molding apparatus 30 showing operations of the molding apparatus 30 to describe the first production method. FIG. 2A shows a state that the upper mold 32 is raised to an uppermost position to open the mold space 34, FIG. 2B shows a state that the upper mold 32 is lowered to a lowermost position to set the capacity of the mold space 34 minimum, FIG. 2C shows a state that the upper mold 32 is being raised by drawing of the gas-dissolving-resin R2 into the mold space 34, and FIG. 2D shows a state that the upper mold 32 is further raised by foaming of the gas-dissolving-resin R2. FIG. 3 is a graph showing a change of a distance or mold space gap t between a bottom surface of the mold space 34 and the top surface of the upper mold 32 as time lapses in a molding process of the first production method.

First, the state shown in FIG. 2A corresponds to point A in the graph of FIG. 3. Specifically, in this state, the upper mold 32 is moved to the uppermost position by driving of the elevating device 50(see FIG.1). Thereby,the mold space gap t becomes maximum in this state, and the mold space 34 is exposed outside.

Next, the upper mold 32 is lowered by downward movement of the main piston rod 53 and the sub piston rods 56 by driving of the elevating device 50. Then, as shown in FIG. 2B, the upper mold main body 32b is slidingly mounted on the lower mold main body 31b, thereby rendering the mold space 34 to a closed state. The state shown in FIG. 2B corresponds to point B in the graph of FIG. 3.

The above state of FIG. 2B is held until point C. Thereupon, the resin outlet port 21c (see FIG. 1) is opened, and the mixing screw 25 is operated by driving of an extrusion cylinder in the hydraulic driving mechanism 29 upon receiving supply of hydraulic oil from the hydraulic unit 40. Thereby, the gas-dissolving-resin R2 in the pressure chamber 26 is extruded toward the molding apparatus 30 via the sealing valve 21d. At the stage of extrusion, the gas-dissolving-resin R2 at the downstream side in the pressure chamber 26 is brought to a mature state, and is supplied into the mold space 34 one after another by way of the resin outlet port 21c, the sealing valve 21d, and the resin supplying channel 33.

The main piston rod 53 and the sub piston rods 56 are moved up and down by supply of hydraulic oil from the hydraulic unit 40 to the elevating device 50. Thereby, the upper mold 32 is moved upward, and as shown in the graph of FIG. 3, the mold space gap t gradually increases from point C toward point D. The state shown in FIG. 2C corresponds to point D in the graph of FIG. 3.

Next, as shown in FIG. 2D, the upper mold 32 is moved upward at a greater speed in a state that the gas-dissolving-resin R2 almost fills the mold space 34, and the mold space gap t increases from point E to point F in the graph of FIG. 3 in a short time period. The great increase of the mold space gap tin a short period causes a depressurized state of the mold space 34. The great depressurization causes the carbon dioxide C dissolved in the gas-dissolving-resin R2 to undergo phase separation and form cells in the resin. A great number of cell nucleators in the gas-dissolving-resin R2 grow to cells as time lapses. Thus, the gas-dissolving-resin R2 expands to such an extent that the expanded resin R2 fills the capacity of the mold space 34.

After the expansion, the gas-dissolving-resin R2 is cooled by the cooling water which circulates the cooling water channels 35, 36 of the lower mold 31 and the upper mold 32 to solidify. Thereby, the gas-dissolving-resin R2 turns into the foamed article R3 in the mold space 34, as shown in FIG. 2D.

Thereafter, when the mold space gap t reaches point G in the graph of FIG. 3, the upper mold 32 is elevated by driving of the elevating device 50, and the foamed article R3 is taken out from the mold space 34 in an opened state. Then, the molding apparatus 30 is resumed to the initial stage shown in FIG. 2A.

Cyclically repeating the operations stepwise from point A to point E in the graph of FIG. 3 produces foamed articles R3 successively.

As mentioned above, in the first production method, carbon dioxide C is supplied to the pressure chamber 26 of the preparing apparatus 20 which has been regulated at a predetermined temperature to diffuse the carbon dioxide C in a molten synthetic resin R1. Thus, the raw material synthetic resin R1 is turned into a gas-dissolving-resin R2 having a great number of cell nucleators. Thereafter, the gas-dissolving-resin R2 is injected to the mold space 34 of the molding apparatus 30 for compression molding. As the upper mold 32 is moved upward at a greater speed, the mold space 34 is rendered into a drastically depressurized state. Thereby, the injected gas-dissolving-resin R2 is turned into a foamed article R3 having a great number of extremely small cells in the mold space 34.

The above arrangement is advantageous in the following points compared to the conventional method in which a mold for injection molding which has a mold space of a predetermined effective capacity is used, and a high-pressurized gas is supplied to the mold space from an additionally provided pressure regulator to regulate the pressure in the mold space by manipulating a valve. Specifically, the arrangement of this embodiment is advantageous in that there is no necessity of pressure regulation by a valve whose manipulation is difficult and that there can be avoided production of molded articles having varied quality due to difficulty of pressure regulation, as well as improving operability of the system.

In addition, the above arrangement is advantageous in that there is no necessity of providing a pressure regulator in the vicinity of a mold, which resultantly contributes to reduction of facility installation cost.

Figure 4A:
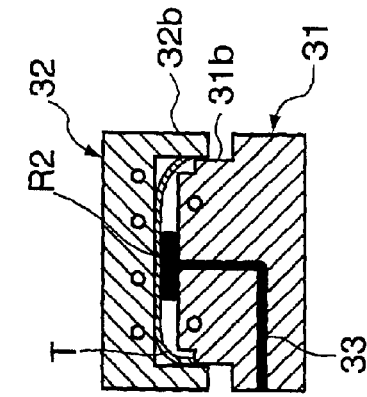
Figure 4B:
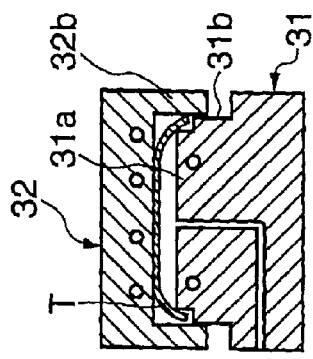
Figure 4C:
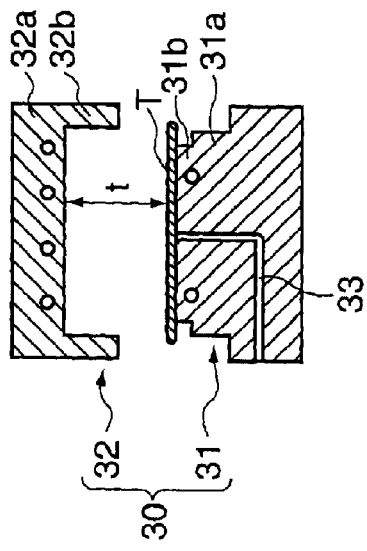
Figure 4D:
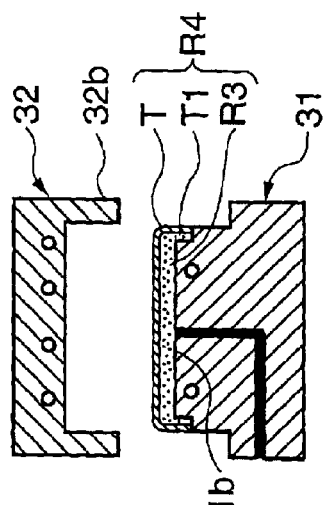
Figure 4E:
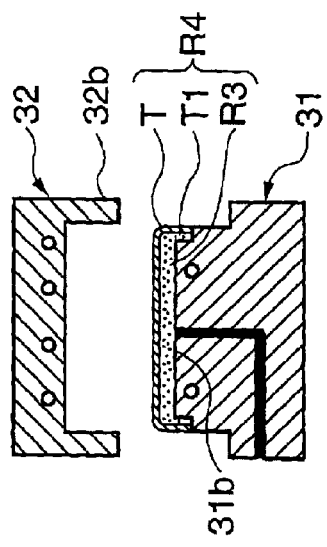
Figure 4F:
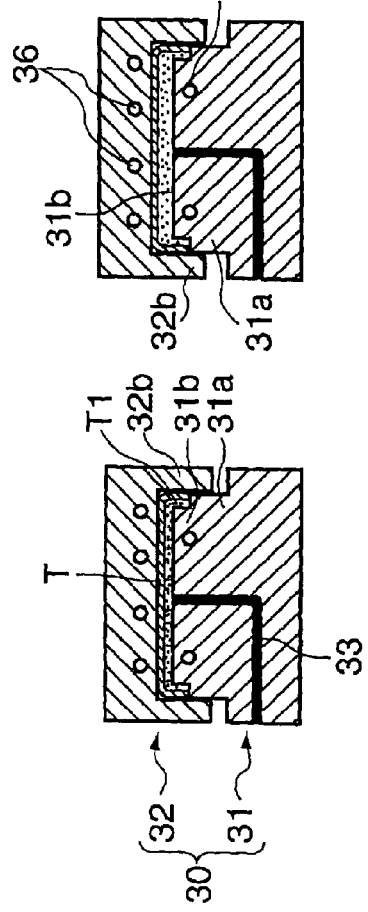
Figure 5:
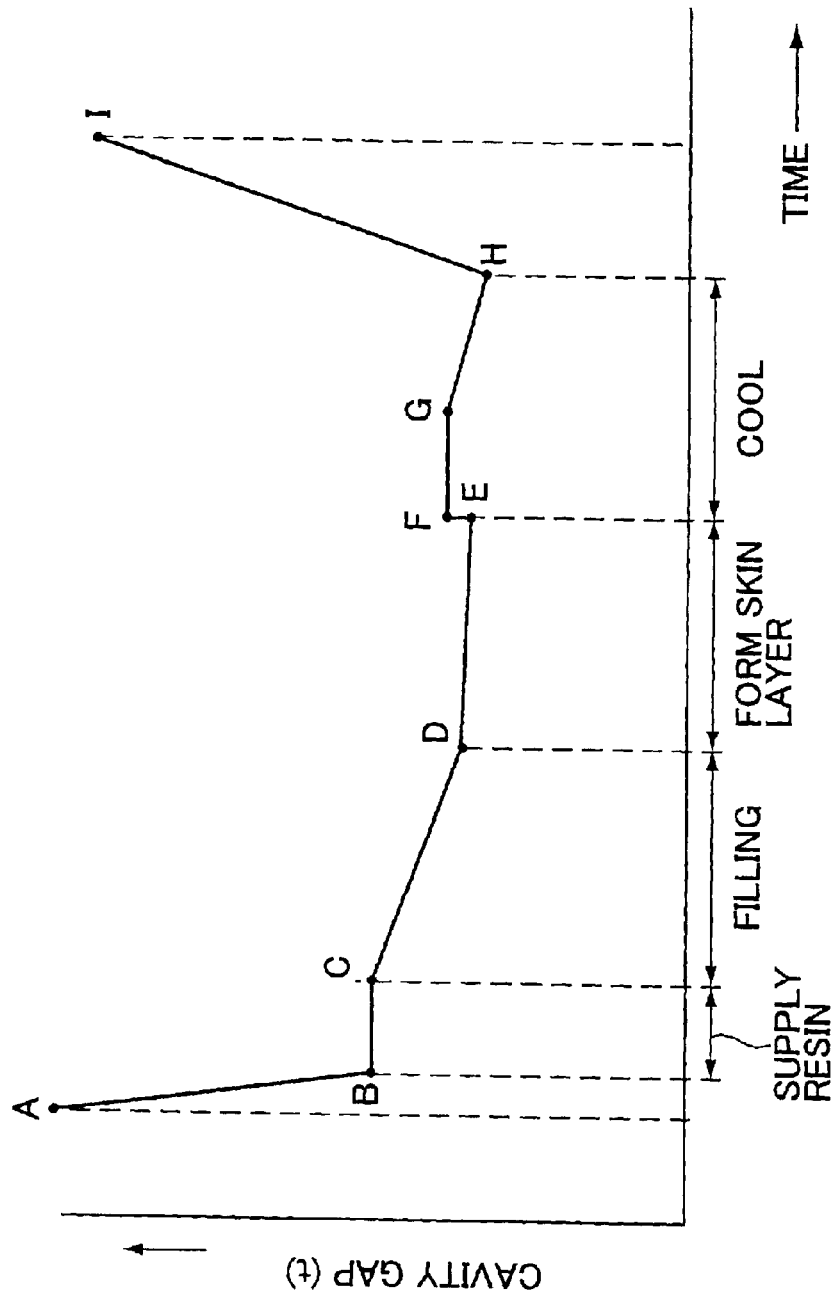
FIG. 5 is a graph showing a mold space gap between the bottom surface of the lower mold and the top surface of the upper mold in the second sequence of operations shown in FIGS. 4A to 4F.

Hereafter, a second method for producing a foamed article with use of the system 10 in the first embodiment is described with reference to FIGS. 4A to 5. FIGS. 4A to 4F are sectional views of the molding apparatus 30 showing operations of the molding apparatus 30 to describe the second production method. Specifically, FIG. 4A shows a state that the upper mold 32 is moved to an uppermost position, and a covering member T is placed over the lower mold 31 of the molding apparatus 30 with the mold space 34 exposed outside. FIG. 4B shows a state that the upper mold 32 is lowered to be mounted on the lower mold 31, and the mold space 34 is defined. FIG. 4C shows a state that a gas-dissolving-resin R2 is supplied into the mold space 34. FIG. 4D shows a state that the upper mold 32 is further lowered, and the mold space 34 has a minimum capacity. FIG. 4E shows a state that the upper mold 32 is raised at a greater speed, and the mold space 34 is rendered into a depressurized state. FIG. 4F shows a state that the upper mold 32 is returned to the uppermost position, and the mold space 34 is opened. FIG. 5 is a graph showing change of a mold space gap t between the bottom surface of the mold space 34 and the top surface of the upper mold 32 as time lapses in a molding process of the second production method.

The second production method is applied to a so-called "integral foaming and molding technique". According to this technique, a molded article R4 comprising a foamed article R3 and a covering member T1 which covers the foamed article R3 is produced by integral foaming and molding. In the second production method, the inner dimension of the upper mold main body 32b is set slightly larger than the outer dimension of the lower mold base member 31a. With this arrangement, the upper mold main body 32b is slidingly mounted on the lower mold base member 31a.

In a molding process of the second production method, as shown in FIG. 4A, the covering member T is placed over the upper surface of the lower mold main body 31b in a state that the upper mold 32 is raised to the uppermost position (point A in FIG. 5). Then, the upper mold 32 is lowered to such an extent that the upper mold 32 is partly mounted on the lower mold base member 31a. Thereby, as shown in FIG. 4B, the covering member T is loaded in the mold space 34 in a state that there is defined a small clearance between a lower surface of the covering member T and the upper surface of the lower mold main body 31b (point B in FIG. 5).

Supplying the gas-dissolving-resin R2 from the preparing apparatus 20 into the mold space 34 in the above state guides the gas-dissolving-resin R2 in the clearance defined by the lower surface of the covering member T and the upper surface of the lower mold main body 31b in the mold space 34, as shown in FIG. 4D (point C in FIG. 5). The mold space gap t is set constant from point B to point C in FIG. 5.

When the clearance mold space t reaches point C in FIG. 5, a filling process is performed to spread the gas-dissolving-resin R2 over the entirety of the lower surface of the covering member T. The filling process is performed by gradually lowering the upper mold 32 by a small height. By the filling process, the mold space gap t is slightly reduced, and as shown in FIG. 4D, the gas-dissolving-resin R2 which has spread over the entire lower surface of the covering member T forms a skin layer T1 underneath the covering member T (point D in FIG. 5). Next, the mold space gap t is further slightly reduced from point D to point E in FIG. 5. Thereby, the skin layer T1 is securely adhered to the covering member T (point E in FIG. 5).

Subsequently, the upper mold 32 is slightly raised by driving the elevating device 50 from the state shown in FIG. 4D (corresponding to point E in FIG. 5) to the state shown in FIG. 4E (corresponding to point F in FIG. 5). Thereby, the mold space 34 is rendered into a drastically depressurized state, and a multitude of cell nucleators grow into cells by phase separation of the carbon dioxide C in the gas-dissolving-resin R2. Thus, the cells are formed from the carbon dioxide in the skin layer T1 as the skin layer T1 is cooled in the mold space 34. The height level of the upper mold 32 is kept unchanged from point F to point G in FIG. 5 to keep the capacity of the mold space 34 unchanged from point F to point G in FIG. 5. Thereafter, the foamed article R3 integrally covered by the covering member T (namely, molded article R4) is produced in a state that the volume of the molded article R4 is slightly smaller than the sum of the volumes of the foamed article R3 and the covering member T by an amount corresponding to shrinkage of the skin layer T1 by cooling and curing (point H in FIG. 5).

Thereafter, the upper mold 32 is raised to the uppermost position corresponding to the mold space gap t equivalent to point A in FIG. 5 by driving the elevating device 50. Thereby, as shown in FIG. 4F, a final product (molded article R4) comprising the foamed article R3 covered with a covering including the skin layer T1 and the covering member T is produced on the upper surface of the lower mold main body 31b (point I in FIG. 5). The molded article R4 is removed from the lower mold main body 31b and is dispatched as a final product after a post-process such as inspection. Cyclically repeating the processes from point A to point I in FIG. 5 produces molded articles R4 successively.

Figure 6:
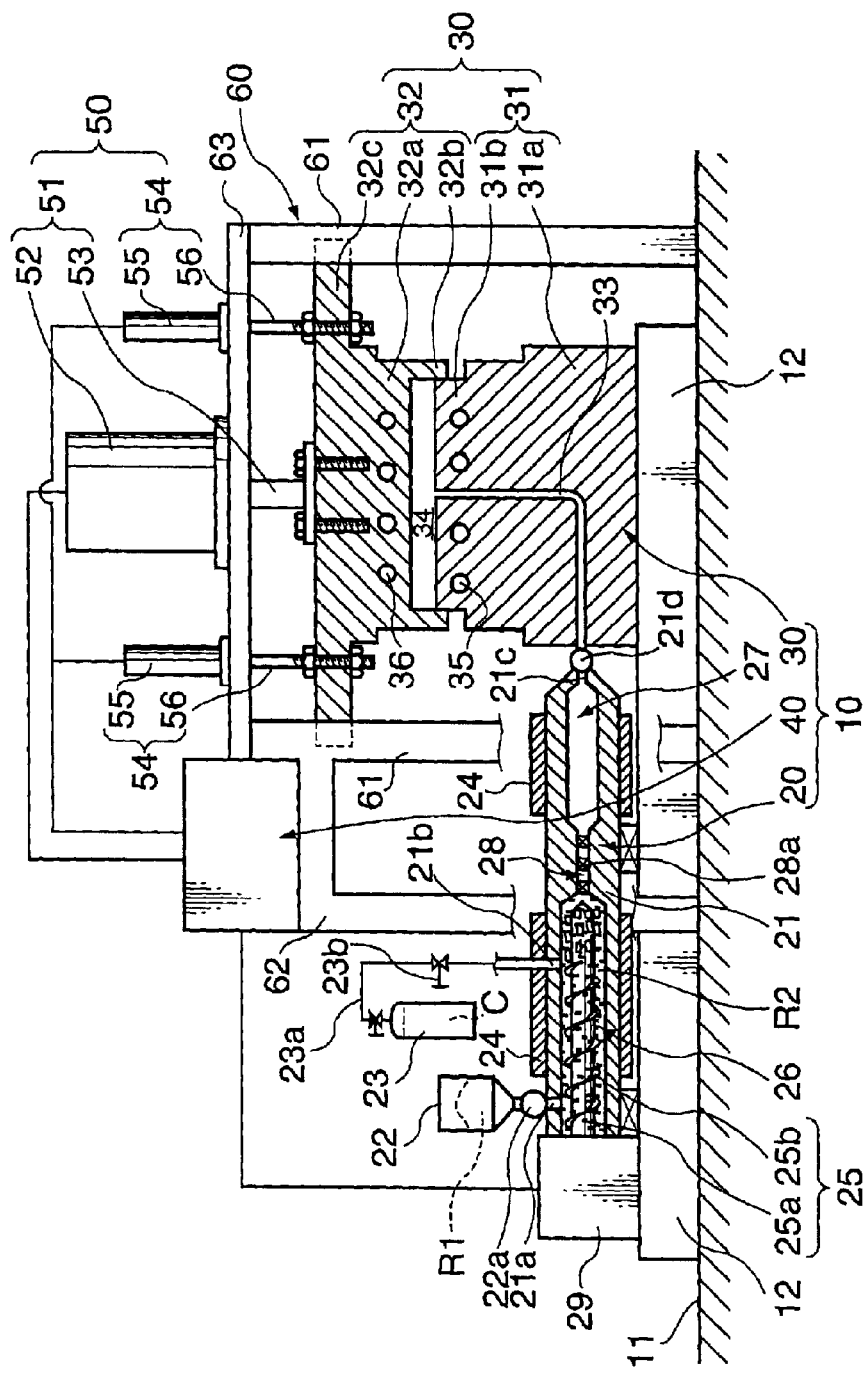
FIG. 6 is a sectional side view of a modified preparing apparatus in the first embodiment.

A modification of the extrusion cylinder 21 in the first embodiment is described with reference to FIG. 6. It should be noted that elements in the modification which are identical to those in the first embodiment are denoted at the same reference numerals. In the modification, preferably, the extrusion cylinder 21 may be divided into two sections by a neck passage 28. A pressure chamber 26 is defined at an upstream side in a material extruding direction with respect to the neck passage 28, and a diffusing chamber 27 is defined at a downstream side with respect to the neck passage 28 in such a manner that diffusion of carbon dioxide C in a gas-dissolving-resin R2 is accelerated while the resin R2 stays in the diffusing chamber 27.

The above arrangement is advantageous in that gas which resultantly constitutes cell nucleators is uniformly diffused in the resin while the resin stays in the diffusing chamber 27 to thereby produce a foamed article distributed with homogenous and superfine cell nucleators. Further, it may be preferable to provide a mixing element or elements 28a in the neck passage 28 to forcibly change the flowing route of the gas-dissolving-resin R2. Mixture of the gas-dissolving-resin R2 with carbon dioxide C is accelerated while passing through the neck passage 28 via the mixing element(s) 28a, thereby diffusing the carbon dioxide C more uniformly in the gas-dissolving-resin R2. It should be noted that the extrusion cylinder 21 in FIG. 1 without the diffusing chamber 27 and the modified extrusion cylinder 21 in FIG. 6 provided with the diffusing chamber 27 are illustrated to have the same length for sake of convenience of explanation. However, on an actual basis, the length of the modified extrusion cylinder 21 in FIG. 6 is longer than that of the extrusion cylinder 21 in FIG. 1 by a length corresponding to the length of the diffusing chamber 27.

Figure 7:
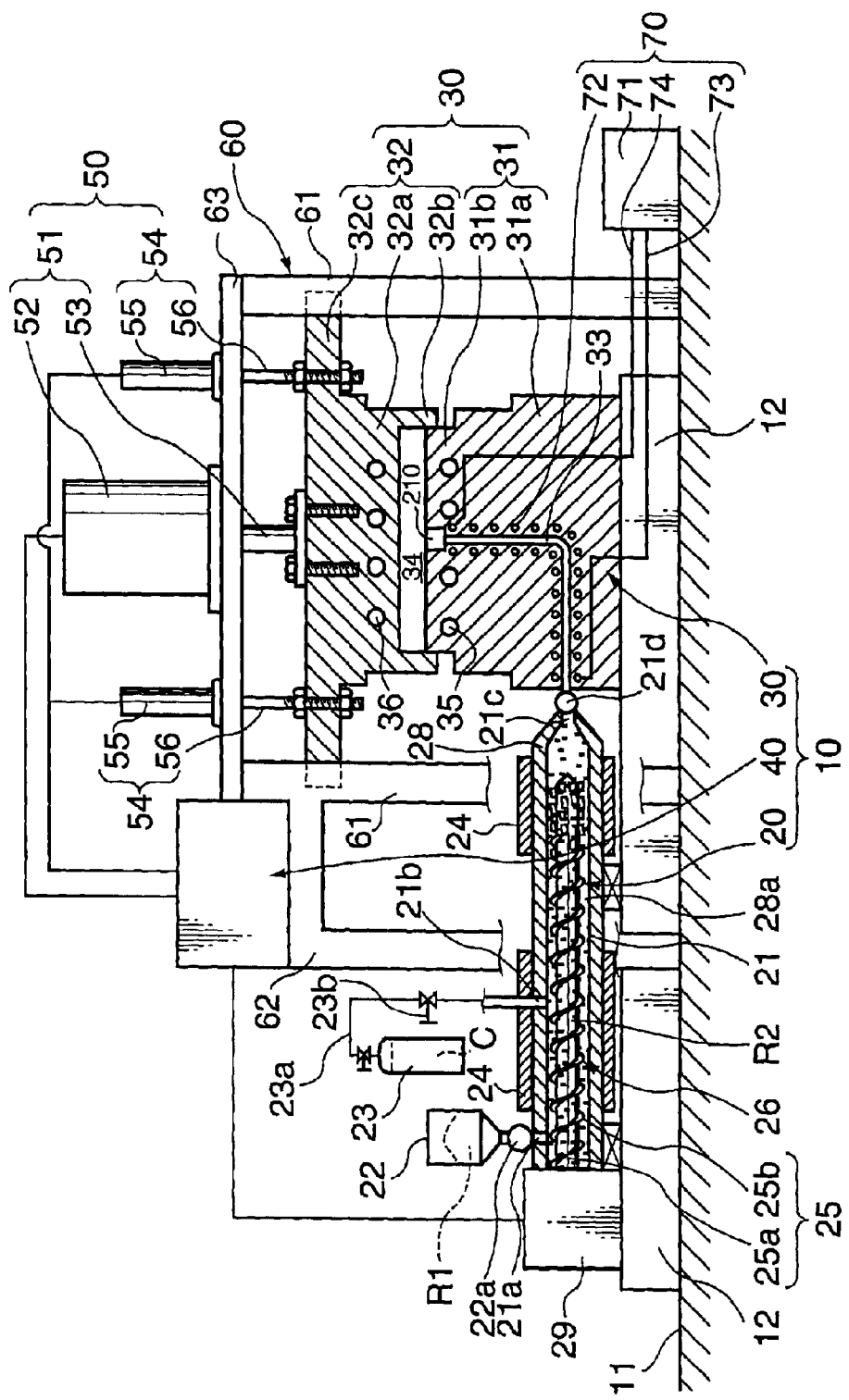
FIG. 7 is a sectional side view of a foamed article producing system in accordance with a second embodiment of the invention.
Figure 8:
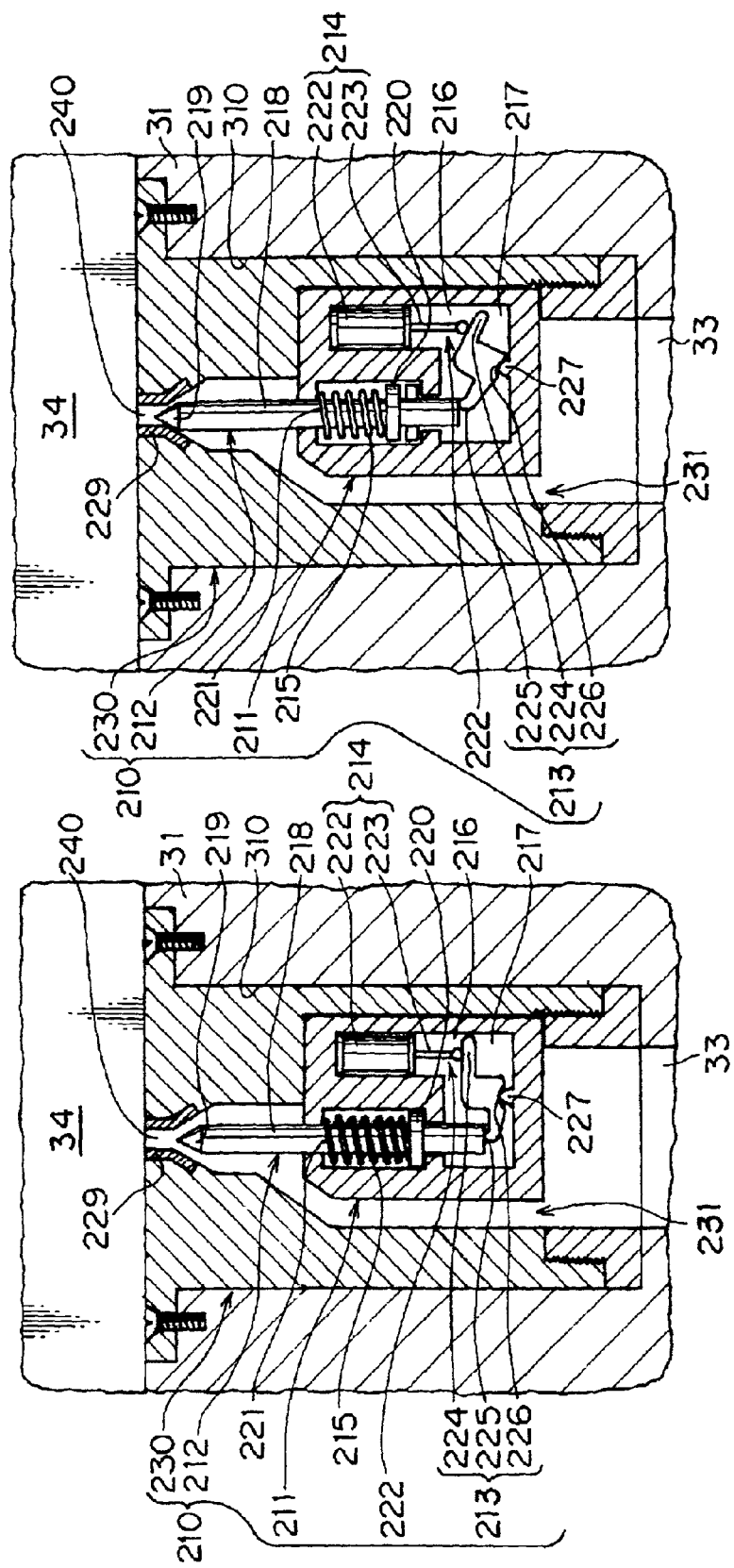
Figure 9:
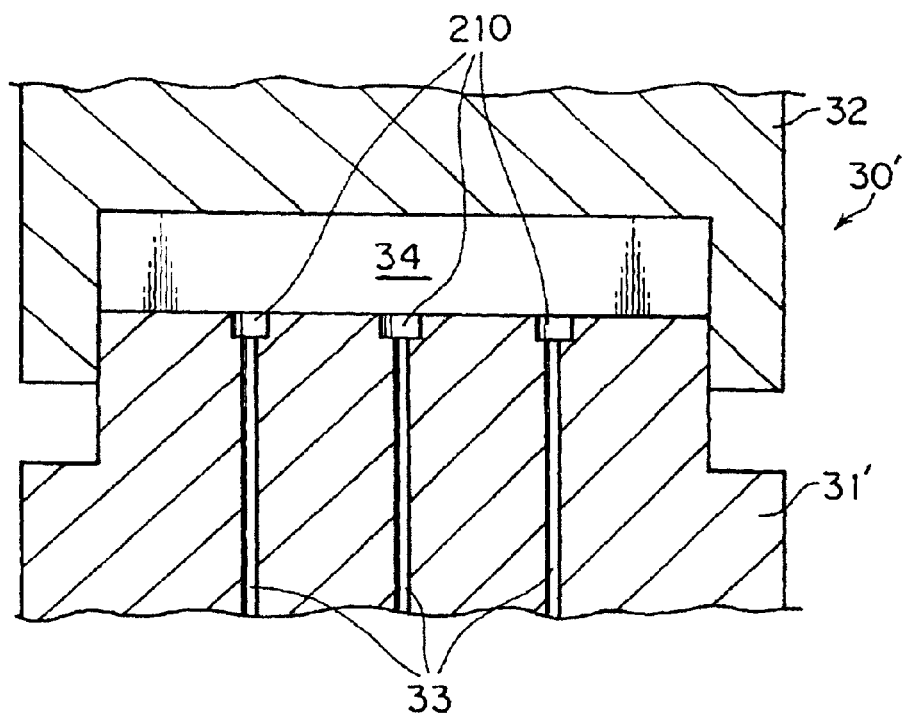
FIG. 9 is a sectional view of a modified molding apparatus in the second embodiment.

FIGS. 7 to 9 are diagrams showing a foamed article producing system in accordance with a second embodiment of the invention. It should be noted that elements in the second embodiment which are identical to those in the first embodiment are denoted at the same reference, and accordingly, a description thereof is omitted herein.

In the second embodiment, a shut-off valve unit 210 (see FIGS. 8A and 8B) is provided at a downstream end of a resin supplying channel 33 in a material drawing direction in a lower mold 31 of a molding apparatus 30. FIGS. 8A and 8B are sectional views of an example of the shut-off valve unit 210, specifically showing states that the valve unit 210 is opened and closed, respectively. As shown in FIGS. 8A and 8B, the shut-off valve unit 210 is tightly screwed by fastening means into a mounting hole 310 which has a diameter slightly larger than a diameter of the resin supplying channel 33 and extends to a bottom surface of the lower mold 31 in the mold space 34.

The shut-off valve unit 210 includes a tubular casing 230 which is fitted in the mounting hole 310, an inner member 211 which is mounted in the casing 230, a needle valve 212 which is mounted inside the inner member 211, and a cylinder device 214 which drivingly opens and closes the needle valve 212 via a link arm 213.

The inner member 211 is formed into a partially cutaway cylindrical shape in a combined form of a chord and an incomplete circle (arch) in plan view. A resin supplying channel 231 having a combined shape of a chord and an incomplete circle (arch) in plan view is defined by an inner circumferential surface at a lower part of the casing 230 with respect to a substantially middle position thereof lengthwise which is not rendered into contact with the inner member 211, and a chord portion of the inner member 211 (namely, an outer circumferential surface of the inner member 211 which is not rendered into contact with the inner circumferential surface of the casing 230).

The inner member 211 has an outer dimension large enough to be slidably fitted in the casing 230. The inner member 211 includes a cylindrical needle valve mounting chamber 215 which is provided at a center position thereof concentrically with an eject port 240, a cylinder mounting chamber 216 which extends in parallel with the needle valve mounting chamber 215, and a link arm mounting chamber 217 which communicates with the needle valve mounting chamber 215 and the cylinder mounting chamber 216 at an upstream side in a material drawing direction (lower side in FIGS. 8A and 8B). A through hole is formed in each of an upstream-side wall and a downstream-side wall of the needle valve mounting chamber 215 to slidably insert the needle valve 212 therethrough.

The needle valve 212 includes a valve main body 218 provided with a pointed conical member 219 at a lead end thereof, and a flange portion 220 which is formed at a base end thereof and is slidably fitted in the needle valve mounting chamber 215. The needle valve 212 is constructed in such a manner that a coil spring 221 in a compressed state is mounted over the valve main body 218 at a portion between the flange portion 220 and the downstream-side wall of the needle valve mounting chamber 215 in a state that the needle valve 212 is mounted in the needle valve mounting chamber 215. With this construction, as shown in FIG. 8A, in an inoperative state of the shut-off valve unit 210, the flange portion 220 is abutted against the upstream-side wall of the needle valve mounting chamber 215 due to a biasing force of the coil spring 221, and the conical member 219 is biased toward the upstream side.

The cylinder device 214 is mounted in an upper part of the cylinder mounting chamber 216 in FIGS. 8A and 8B. The cylinder device 214 includes a cylinder 222, and a piston rod 223 which extends downwardly from a lower end of the cylinder 222. The cylinder device 214 is operated in such a manner that the piston rod 223 is projected and retracted back and forth with respect to the cylinder 222 by a hydraulic pressure of hydraulic oil which is supplied from a hydraulic unit 40 (see FIG. 7), thereby rendering the link arm 213 into an operative state.

The link arm 213 includes a pressed portion 224 which extends radially outwardly in the inner member 211 to be pressed by a lead end of the piston rod 223, a pressing portion 225 which presses a lower surface of the valve main body 218 upwardly about a center position of the cylinder 222, and a recessed portion 226 which has a substantially inverted U-shape and is formed in a middle part between the pressing portion 225 and the pressed portion 224.

A support projection 227 is formed at an upper surface of a bottom wall of the link arm mounting chamber 217 at a position corresponding to the recessed portion 226. The link arm 213 is constructed in such a manner that in a retracted state of the piston rod 223, the lead end of the piston rod 223 is abutted against the pressed portion 224 in a state that the recessed portion 226 covers the support projection 227, and the pressing portion 225 is abutted against the lower surface of the valve main body 218.

The hole formed in the upper portion of the casing 230 is formed into a conical shape in correspondence to the conical member 219 of the needle valve 212. Thereby, the eject port 240 of a conical shape is formed in the casing 230 to eject a gas-dissolving resin R2 into a mold space 34.

An annular insulating member 229 made of a synthetic resin material (such as silicon resin and polytetrafluoroethylene) having excellent durability and insulation is adhered on an inner circumference of the eject port 240. With this arrangement, the gas-dissolving-resin R2 is securely insulated from being cooled by heat exchange with a cooled foamed article R3 at a region around the eject port 240.

In the shut-off valve unit 210 thus constructed, in the case where the gas-dissolving resin R2 is supplied into the mold space 34 of the molding apparatus 30 along the resin supplying channel 33, as shown in FIG. 8A, the cylinder device 214 is driven to retract the piston rod 223 inside the cylinder 222. Then, the flange portion 220 is pressed upward by a biasing force of the coil spring 221, and the valve main body 218 is moved downward as the link arm 213 is rotated counterclockwise about an axis of the support projection 227. Thereby, the conical member 219 is retracted away from the annular insulating member 229 to render the eject port 240 in an opened state.

At this time, the link arm 213 is rotated counterclockwise about an axis of the lead end of the support projection 227 as the pressing portion 225 presses the lower surface of the valve main body 218. Thereby, the pressed portion 224 is kept in a contact state with the lead end of the piston rod 223. As the eject port 240 is opened in the aforementioned manner, the gas-dissolving-resin R2 is supplied through the eject port 240 into the mold space 34 along the resin supplying channel 33.

Thereafter, in the case where supplying of the gas-dissolving-resin R2 along the resin supplying channel 33 into the mold space 34 is suspended, as shown in FIG. 8B, the cylinder device 214 is driven to project the piston rod 223 outward from the cylinder 222. Then, the link arm 213 is rotated clockwise about the axis of the support projection 227 against the biasing force of the coil spring 221. As the link arm 213 is rotated, the valve main body 218 is moved upward, and the conical member 219 is abutted against an inner surface of an upstream end of the annular insulating member 229, as shown in FIG. 8B, whereby the supplying of the gas-dissolving-resin R2 into the mold space 34 through the eject port 240 is suspended.

In the second embodiment, a molten-state retaining unit (heating means) 70 is provided to keep the gas-dissolving-resin R2 in the resin supplying channel 33 of the lower mold 31 in a heated state to retain its molten state. The retaining unit 70 includes a power source device 71, a heater member 72 which is spirally wound around the resin supplying channel 33 in the lower mold 31, a power line 73 which is connected to one end of the heater member 72 to supply power from the power source device 71, and a ground line 74 connected to the opposite end of the heater member 72.

When power is supplied from the power source device 71 to the heater member 72, the gas-dissolving-resin R2 in the resin supplying channel 33 is heated at a temperature (generally in the range from 150° C. to 200° C. depending on the kind of gas-dissolving-resin R2) necessary to maintain a molten state of the gas-dissolving-resin R2 in the resin supplying channel 33.

Providing the remaining unit 70 eliminates the following drawback. In the case where a plurality of resin supplying channels are provided in a large-sized molding apparatus, which resultantly lengthens the total length of the resin supplying channels, a gas-dissolving resin in such long resin supplying channels may be cooled to solidify while passing through such long resin supplying channels, thereby clogging the channels.

It should be appreciated that a molded article R4 can be produced by the first production method shown in FIGS. 2A to 3 or the second production method shown in FIGS. 4A to 5 with use of the foamed article producing system in accordance with the second embodiment of the invention.

Specifically, as mentioned above, the molten-state retaining unit 70 is provided in the second embodiment to retain a molten state of the gas-dissolving-resin R2 in the resin supplying channel 33 of the lower mold 31. In this arrangement, when a sealing valve 21d is opened in a state that a molten resin preparing apparatus 20 is in an operative state, molten gas-dissolving-resin R2 which has been prepared in the preparing apparatus 20 is supplied into the resin supplying channel 33 via a resin outlet pipe 228 and the sealing valve 21d, and is introduced to the mold space 34 of the molding apparatus 30 via the shut-off valve unit 210.

The gas-dissolving resin R2 in the resin supplying channel 33 has its molten state maintained by heating of the heater member 72 due to power supply from the power source device 71. In this arrangement, even if the resin supplying channel 33 is long, there is no likelihood that the resin supplying channel 33 is clogged by cooled and solidified resin due to lowering of the temperature of the gas-dissolving-resin R2 than a molten temperature while being conveyed along the resin supplying channel 33. Further, this arrangement enables to shut off the mold space 34 from the resin supplying channel 33 by the shut-off valve unit 210. Accordingly, there is no likelihood that the foaming process in the mold space 34 affects the gas-dissolving-resin R2 in the resin supplying channel 33 such that the gas-dissolving-resin R2 in the channel 33 may be foamed prior to be supplied into the mold space 34.

Upon completion of drawing the gas-dissolving-resin R2 into the mold space 34 of the molding apparatus 30, the resin R2 is solidified by cooling of the molding apparatus 30 to thereby produce a foamed article. In the cooling process, gas-dissolving resin R2 in the resin supplying channel 33 near the mold space 34 may also be cooled, whereby the resin R2 which is solidified by cooling may clog in the resin supplying channel 33. This arrangement, however, eliminates such a drawback by heating the resin R2 in the resin supplying channel 33, thereby preventing a drawback that productivity of foamed article is lowered due to suspension of operation of the system resulting from clogging.

FIG. 9 is a sectional view of a modified molding apparatus 30' in the second embodiment. In this modification, a plurality of resin supplying channels 33 are formed in a lower mold 31' of the molding apparatus 30'. Specifically, in FIG. 9, three resin supplying channels 33 are formed. A shut-off valve unit 210 is arranged at an upper end of each resin supplying channel 33 to oppose a mold space 34.

In the modification, since a plurality of resin supplying channels 33 are formed in the lower mold 31', the amount of gas-dissolving resin R2 supplied into the mold space 34 per unit time can be increased. Further, since the shut-off valve unit 210 is provided in each resin supplying channel 33, there is no likelihood that the resin R2 in the resin supplying channels 33 may be foamed prior to being supplied into the mold space 34. This arrangement is a suitable way to cope with a large-sized molding apparatus 30'.

Figure 10:
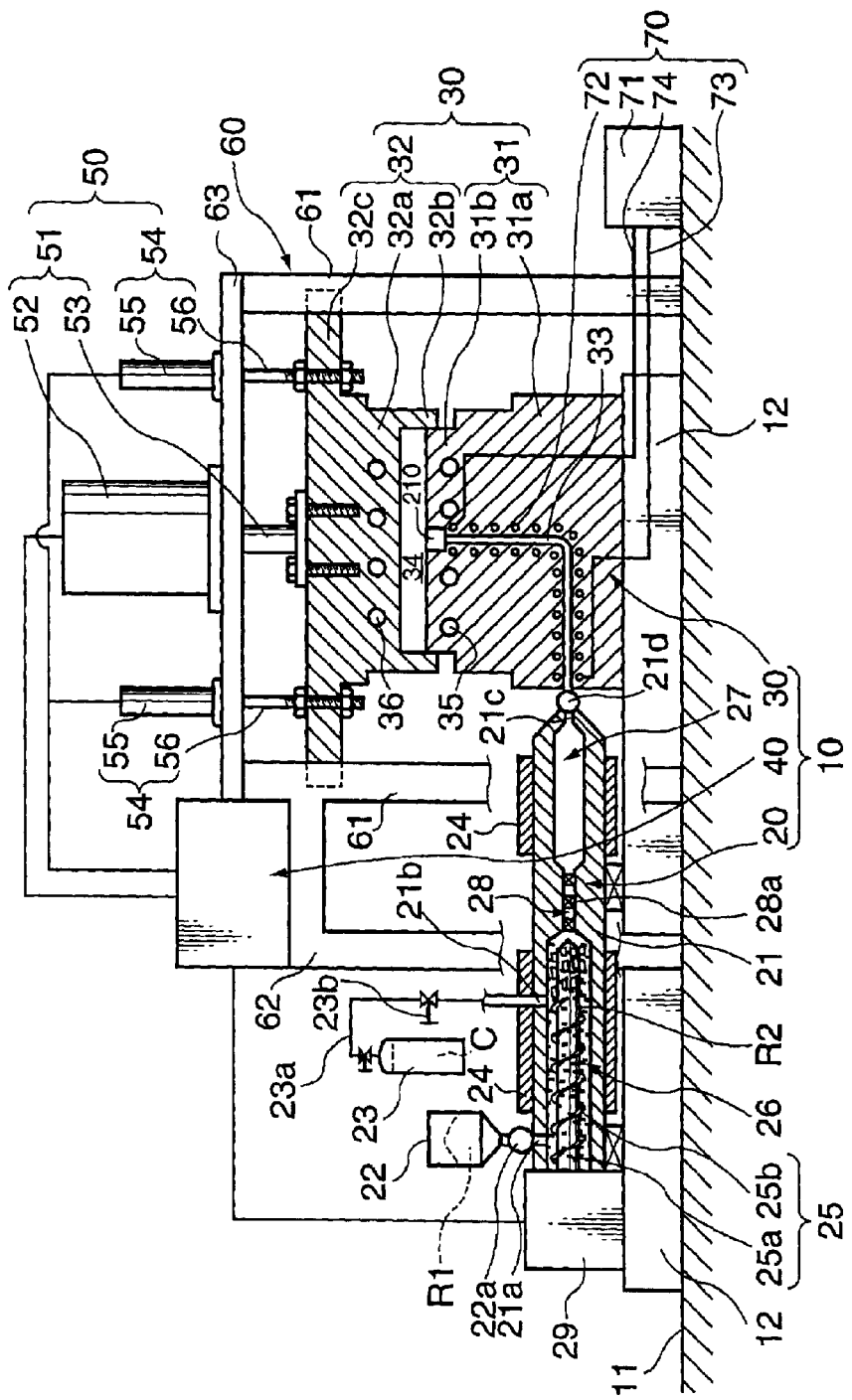
FIG. 10 is a sectional side view of a modified preparing apparatus in the second embodiment.

A modification of the extrusion cylinder 21 in the second embodiment of this invention is described with reference to FIG. 10. It should be noted that elements in the modification which are identical to those in the second embodiment are denoted at the same reference numerals. In the modification, preferably, the extrusion cylinder 21 may be divided into two sections by a neck passage 28. A pressure chamber 26 is defined at an upstream side in a material extruding direction with respect to the neck passage 28, and a diffusing chamber 27 is defined at a downstream side with respect to the neck passage 28 in such a manner that diffusion of carbon dioxide C in a gas-dissolving-resin R2 is accelerated while the resin R2 stays in the diffusing chamber 27. The arrangement of the neck passage 28, the diffusing chamber 27, and a mixing element or elements 28a in the neck passage 28 is the same as shown in FIG. 6.

Figure 11:
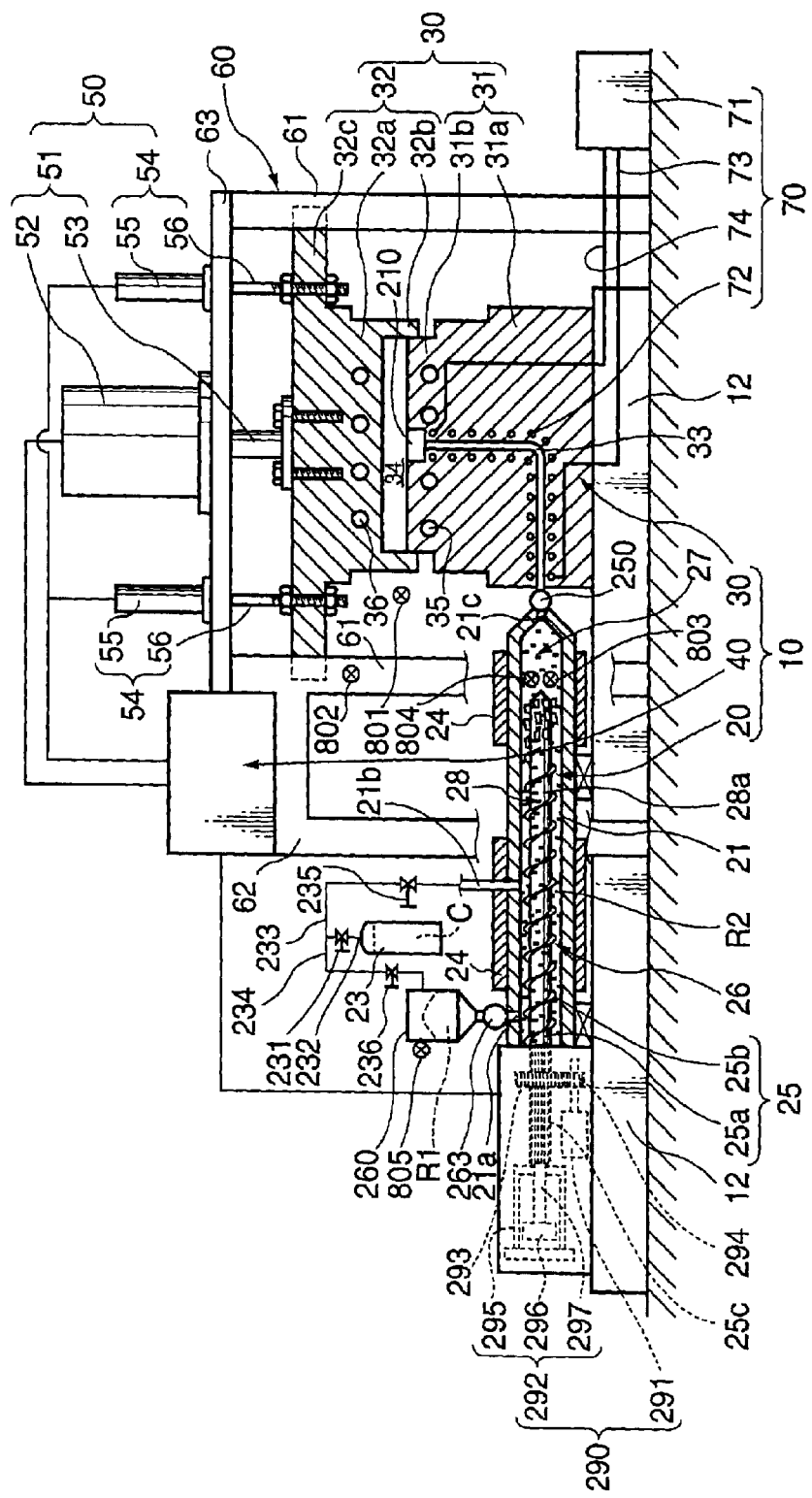
FIG. 11 is a sectional side view of a foamed article producing system in accordance with a third embodiment of the invention.
Figure 12:
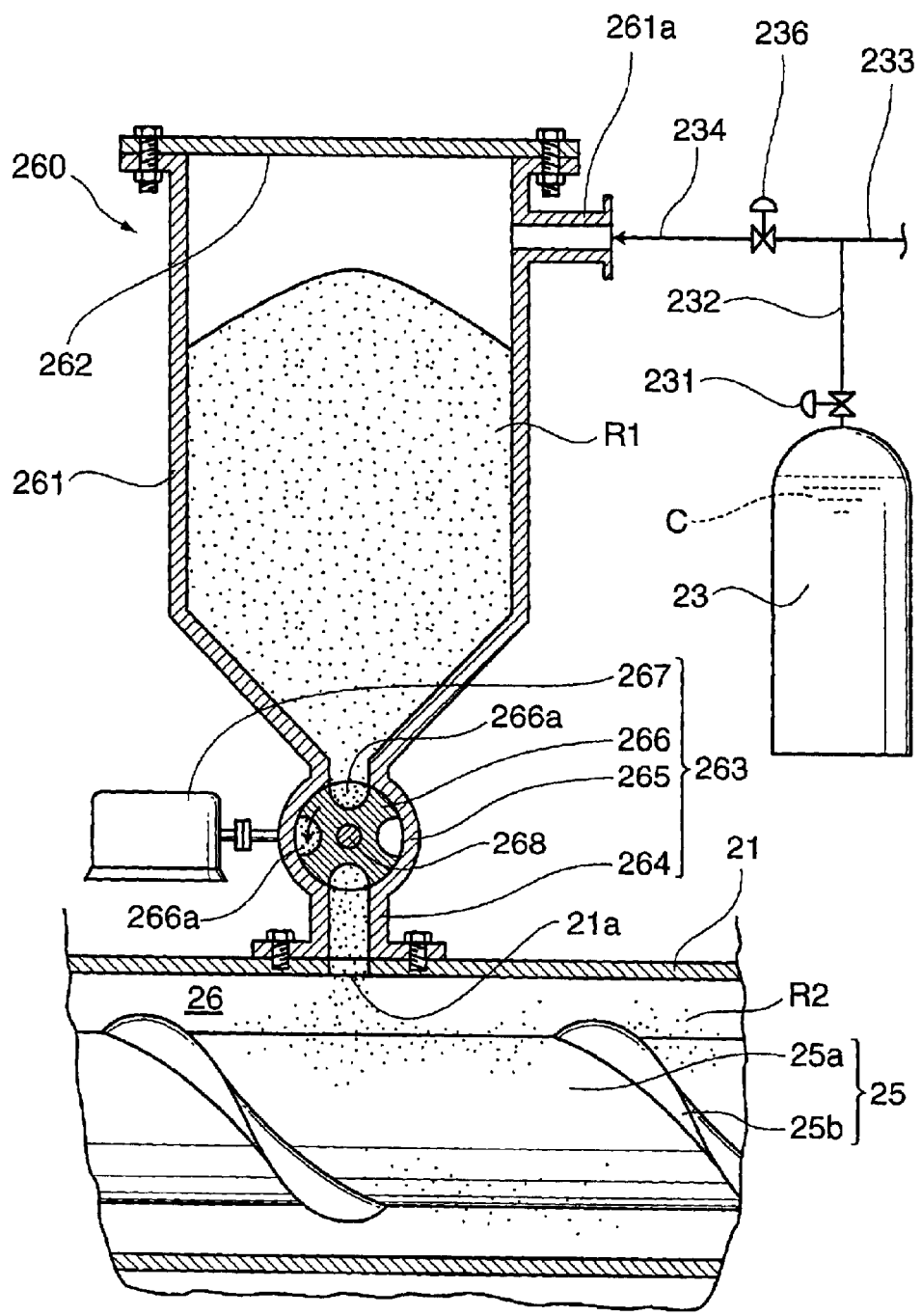
FIG. 12 is a sectional side view of a raw material hopper provided in the foamed article producing system shown in FIG. 10.
Figure 13A:
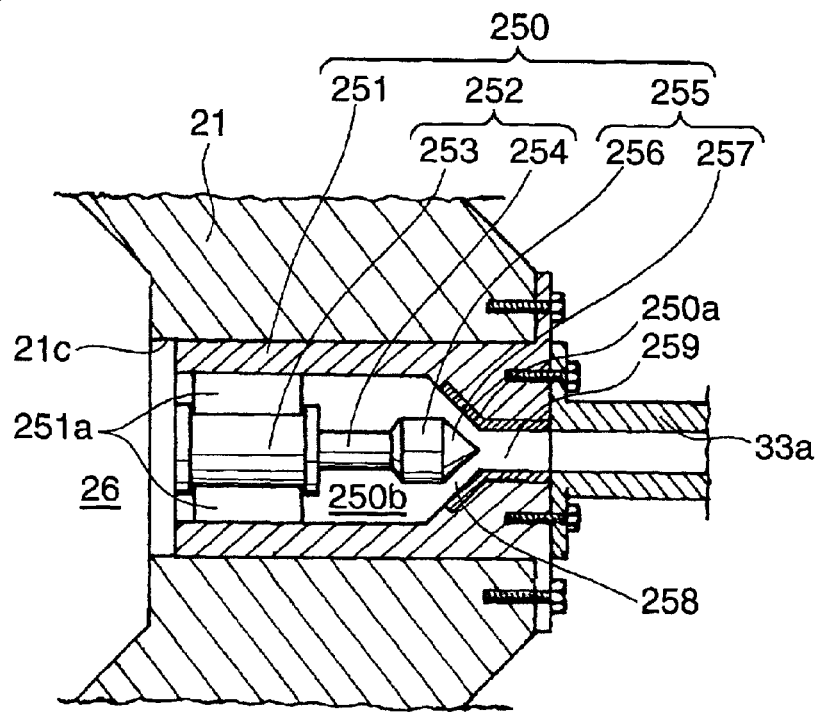
Figure 13B:
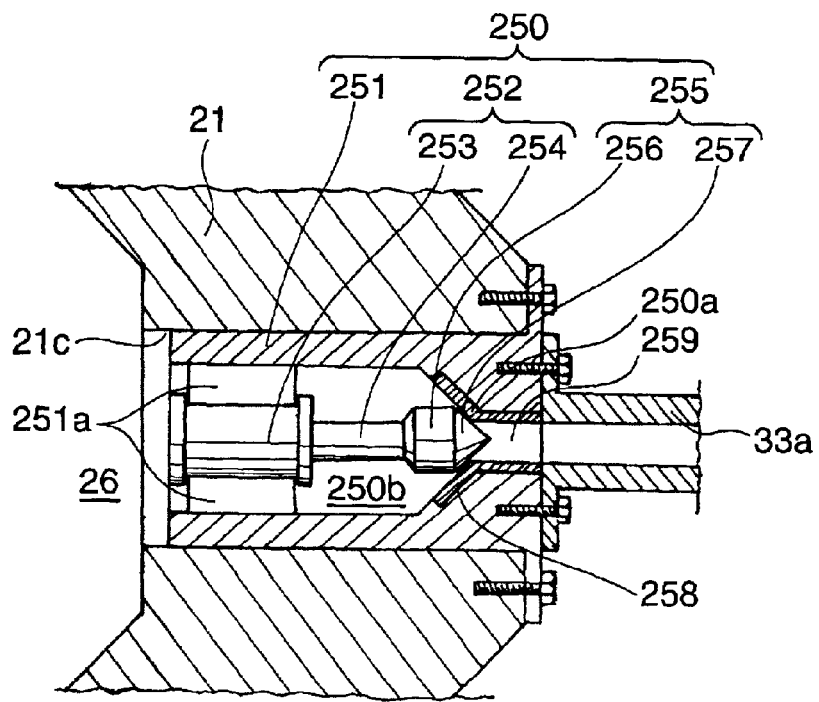

FIG. 11 is a diagram showing a foamed article producing system in accordance with a third embodiment of the invention. In the third embodiment, a hydraulic driving mechanism 290 for driving an mixing screw 25 of a molten resin preparing apparatus 20 enables to regulate a back pressure which is applied to a gas-dissolving resin in the preparing apparatus 20 by combined movement of rotating and moving the screw 25 forward and backward. A back pressure control will be described later. A raw material hopper 260 shown in FIG. 11 corresponds to the raw material hopper 22 in FIG. 1, and an open/close valve unit 250 in FIG. 11 corresponds to the sealing valve 21d in FIG. 1. Constructions of the raw material hopper 260 and the open/close valve unit 250 are as shown in FIGS. 12 and 13A, 13B, respectively. Elements in the third embodiment which are identical to those in the first embodiment shown in FIG. 1 and those in the second embodiment shown in FIG. 7 are denoted at the same reference numerals, and accordingly, a description thereof is omitted herein.

As shown in FIG. 12, the raw material hopper 260 has an opening opened upward, and includes a hopper main body 261 formed into a funnel-shape at a bottom portion thereof, a cover member 262 for openably closing an upper opening of the hopper main body 261, and a rotary valve unit 263 which is provided at a bottom opening of the funnel-shaped portion of the hopper main body 261 and extends toward a extrusion cylinder 21. The cover member 262 is detachably mounted by a bolt and fastening means on a flange portion of the hopper main body 261 which extends radially outwardly on an upper rim of the hopper main body 261 over its entire circumference.

The rotary valve unit 263 includes a raw material supplying pipe 264 which is provided between the bottom opening of the hopper main body 261 and a resin inlet port 21a of the extrusion cylinder 21, a tubular housing 265 which is provided inside the raw material supplying pipe 264 and extends in a direction orthogonal to the longitudinal direction of the raw material supplying pipe 264, a rotor 266 mounted in the housing 265, and an electric motor 267 which drivingly rotates the rotor 266.

A flange portion is formed at a lower end of the raw material supplying pipe 264. Fastening the flange portion of the raw material supplying pipe 264 to the extrusion cylinder 21 by a bolt and fastening means or welding means enables to render the hopper main body 261 communicable to a pressure chamber 26 via the raw material supplying pipe 264 and the resin inlet port 21a.

The rotor 266 is rotatable together with a center shaft 268 about an axis thereof in a state that the center shaft 268 passes through the rotor 266 and is fixed at a center position of the rotor 266. The rotor 266 is formed with a plurality of recesses 266a equidistantly along a circumference thereof in such a manner that an opening of each recess 266a extends radially outward in a cylindrical member thereof which has an outer diameter to be slidably fitted in the housing 265. A circumferential width of an opening of each recess 266a is substantially the same as a diameter of the raw material supplying pipe 264.

A raw material synthetic resin R1 in the hopper main body 261 is distributed in the recesses 266a which are located at the bottom opening of the hopper main body 261 by rotation of the rotor 266 about the axis of the center shaft 268. Each time one of the recesses 266a loaded with the resin R1 opposes the resin inlet port 21a as the rotor 266 is rotated, the resin R1 in the recess 266a is supplied into the pressure chamber 26 via the raw material supplying pipe 264 and the resin inlet port 21a.

The recesses 266a are arranged at such a position as to render the hopper main body 261 in direct communication with the pressure chamber 26. In this arrangement, the resin R1 in the hopper main body 261 is successively supplied into the pressure chamber 26 in accordance with rotation of the rotor 266 while securing air-tightness of the hopper main body 261 and the pressure chamber 26.

The electric motor 267 has its drive shaft coupled to the center shaft 268 by a speed reducing mechanism (not shown). The rotor 266 is integrally rotated with the center shaft 268 by driving the electric motor 267.

A gas inlet pipe 261a is provided at an upper side portion on a circumference of the hopper main body 261 to draw carbon dioxide C from a gas cylinder 23. Introducing carbon dioxide C in the gas cylinder 23 along the gas inlet pipe 261a enables to attain a predetermined atmosphere (pressure) of carbon dioxide inside the hopper main body 26a.

The gas cylinder 23 is adapted to store carbon dioxide which has been compressed to a predetermined high pressure. A main pipe 232 is supplied from the gas cylinder 23 via a source valve 231. A lead end of the main pipe 232 is branched into two sub pipes 233, and 234. The first sub pipe 233 has its lead end connected to a gas inlet port 21b of the extrusion cylinder 21, and the second sub pipe 234 has its lead end connected to the gas inlet pipe 261a of the hopper main body 261.

The first sub pipe 233 is provided with a first valve 235, and the second sub pipe 234 is provided with a second valve 236. Selectively opening and closing the first valve 235 and the second valve 236 enables to supply carbon dioxide C into the pressure chamber 26 and the hopper main body 261 and suspend their supplying operations.

In the pipe arrangement of drawing carbon dioxide C from the gas cylinder 23 and construction of the raw material hopper 260, controllably supplying carbon dioxide C from the gas cylinder 23 into the pressure chamber 26 and suspending its supplying operation by manipulating the first valve 235 enables to control an environment of carbon dioxide in the pressure chamber 26. Likewise, manipulating the second valve 236 enables to control an environment of carbon dioxide in the hopper main body 261.

Setting an environment for carbon dioxide at a predetermined temperature and a predetermined pressure in the hopper main body 261 enables to dissolve carbon dioxide C in the raw material synthetic resin R1 to a certain extent before being supplied to the extrusion cylinder 21. Thereby, the staying period of the resin R1 in the extrusion cylinder 21 can be shortened, and productivity of a foamed article can be raised.

The hydraulic driving mechanism 290 includes, as shown in FIG. 11, a screw driving motor 291 which drivingly rotates the mixing screw 25 about an axis thereof, and a hydraulic cylinder 292 for moving the mixing screw 25 forward and backward. The hydraulic driving mechanism 290 and the mixing screw 25 constitute a resin pressure mechanism for moving the resin downstream by applying a back pressure to a gas-dissolving-resin in the preparing apparatus 20. A rotating force of the screw driving motor 291 is transmitted to the mixing screw 25 via a driving gear 293 which is concentrically rotated with a drive shaft of the screw driving motor 291 and a driven gear 294 which is concentrically rotated with a screw shaft 25a.

The screw shaft 25a includes a spline shaft 25c which extends from a base end thereof toward the hydraulic cylinder 292. The driven gear 294 is mounted on the spline shaft 25c to be concentrically movable thereto and rotatable therewith. In this arrangement, a rotating force of the driven gear 294 is transmitted to the mixing screw 25 via the spline shaft 25c.

The hydraulic cylinder 292 includes a tubular cylinder main body 295, a piston 296 which is concentrically mounted in the cylinder main body 295, and a piston rod 297 which concentrically protrudes toward the spline shaft 25c from the piston 296. A lead end of the piston rod 297 is integrally and concentrically coupled to a base end of the spline shaft 25c. In this arrangement, forward and backward movement of the piston 296 by supply of hydraulic oil from the hydraulic unit 40 is transmitted to the spline shaft 25c via the piston rod 297. Then, the mixing screw 25 is movable forward and backward in the pressure chamber 26 by driving the hydraulic cylinder 292 in a state that the gas-dissolving-resin R2 is loaded in the pressure chamber 26. Thus, a back pressure to be applied to the gas-dissolving-resin R2 is regulated.

FIG. 13A shows a state that a resin outlet port 21c is opened, and FIG. 13B shows a state that the resin outlet port 21c is closed. As shown in FIGS. 13A and 13B, the open/close valve unit 250 includes a tubular casing 251, a cylinder device 252 mounted in the casing 251, and a needle valve 255 which moves forward and backward by driving the cylinder device 252.

The casing 251 has an outer diameter to be slidably fitted in the resin outlet port 21c of the extrusion cylinder 21. A flange portion is formed at a right end of the casing 251 in FIGS. 13A and 13B. Fastening the flange portion to an end surface of the extrusion cylinder 21 by a bolt and fastening means in a state that the flange portion is fitted in the resin outlet port 21c fixes the casing 251 to the extrusion cylinder 21.

The casing 251 is formed with a mounting chamber 250b which concentrically mounts the cylinder device 252 therein. A conical opening 258 which is formed concentrically with the mounting chamber 250*b* and an eject port 259 extending from the conical opening 258 are formed in a lead end portion of the mounting chamber 250*b*. An annular insulating member 250*a* made of a synthetic resin material (such as silicon resin and polytetrafluoroethylene) which has excellent durability and insulation is adhered on an inner circumference of the conical opening 258 and the eject port 259. The annular insulating member 250*a* insulates a region of the mounting chamber 250*b* around the conical opening 258 and the eject port 259 from heat.

A connecting pipe 33*a* which extends from a resin supplying channel 33 of a lower mold 31 is connected to a lead end of the casing 251 by a bolt and fastening means concentrically with the casing 251. Thereby, the eject port 259 of the casing 251 is communicable to the resin supplying channel 33 along the connecting pipe 33*a*.

The cylinder device 252 includes a cylinder 253 which is driven upon receiving a hydraulic pressure from the hydraulic unit 40, and a piston rod 254 which is moved forward and backward by driving the cylinder 253. The needle valve 255 is fixed to a lead end of the piston rod concentrically, and is moved toward and away from the eject port 259 as the piston rod 254 is moved back and forth by driving the cylinder 253.

The needle valve 255 includes a cylindrical valve main body 256 which is fixed to a lead end of the piston rod 254 concentrically, and a conical portion 257 which protrudes from a lead end of the valve main body 256 concentrically. The valve main body 256 is fixed to the mounting chamber 250*b* by being supported by a plurality of support plates 251*a* which extend from an inner circumferential wall of the mounting chamber 250*b* radially toward a center thereof.

An outer circumferential surface of the conical portion 257 is tilted relative to an axis thereof with an angle identical to a tilting angle of the conical opening 258. In this arrangement, when the needle valve 255 is pushed forward, the outer circumferential surface of the conical portion 257 is pressed against the inner circumferential surface of the conical opening 258, as shown in FIG. 13B. Thereby, the gas-dissolving-resin R2 in the pressure chamber 26 is blocked from being supplied out through the eject port 259.

In the above construction of the open/close valve unit 250, as shown in FIG. 13A, as the needle valve 255 is retracted toward cylinder device 252, the open/close valve unit 250 is set to an opened state in which the conical portion 257 is moved away from the inner circumferential surface of the annular conical opening 258. Thereby, the resin R2 in the pressure chamber 26 is pushed out toward the connecting pipe 33*a* via the mounting chamber 250*b* and the eject port 259.

Then, the needle valve 255 is moved forward by driving the cylinder device 252. Thereupon, the needle valve 255 is changed from the state shown in FIG. 13A to a state shown in FIG. 13B in which a circumferential surface of the conical portion 257 is pressed against the inner circumferential surface of the conical opening 258 with the annular insulating member 250*a* interposed therebetween. Thereby, the resin R2 in the pressure chamber 26 is blocked from flowing toward the connecting pipe 33*a*.

The operation of each of the foamed article producing system 10 is controlled by a controller 800 including a microcomputer. FIG. 15 is a block diagram showing an example of control operations of the system 10 by the controller 800. Hereinafter, exemplified control operations of the system 10 by the controller 800 are described with reference to FIG. 15, and FIGS. 11 and 12 according to needs.

As shown in FIG. 15, a foamed article sensor 801 for detecting presence or absence of a foamed article in the mold space 34 and a level sensor 802 for detecting a vertical positional level of the upper mold 32 (see FIG. 11) are provided in the vicinity of the upper mold 32 for control operations of the system 10. A back pressure sensor 803 for detecting a back pressure applied by the mixing screw 25 and a temperature sensor 804 for detecting a temperature in the pressure chamber 26 are provided at respective appropriate positions in the pressure chamber 26 of the extrusion cylinder 21 (see FIG. 11). A pressure sensor 805 for detecting a pressure in the hopper 260 (see FIG. 11) is provided at an appropriate position of the raw material hopper 260.

Detection signals from the sensors 801 to 805 are output to the controller 800. Upon receiving a detection signal, the controller 800 outputs a control signal to operative members of the system 10 based on pre-stored program data. Thereby, the system 10 is controlled to automatically perform a series of molding processes.

The foamed article sensor 801 comprises photoelectric members including a light emitting element and a light receiving element in such a manner that the light emitting element and the light receiving element are opposed each other slightly above the upper surface of the lower mold 31. This arrangement enables the controller 800 to determine whether the foamed article R3 is inside the lower mold 31 based on a judgement as to whether the light receiving element receives light from the light emitting element although the system is constructed in such a manner that the upper mold 32 is located relatively high above the lower mold 31 (see FIG. 2A).

The level sensor 802 is a known sensor for detecting a position of the flange portion 32*c* of the upper mold 32. The back pressure sensor 803 for detecting a back pressure in the pressure chamber 26 and the pressure sensor 805 for detecting a pressure of carbon dioxide C in the hopper 260 are each comprised of a piezoelectric element which generates an electromotive force in accordance with a pressure exerted thereto. The piezoelectric element is attached to an appropriate position on each of an inner wall of the pressure chamber 26 and the hopper 260 in a flush state thereto. The temperature sensor 804 includes a thermo-sensitive element which is attached to an appropriate position on the inner wall of the pressure chamber 26.

The controller 800 includes a central processing unit (CPU) 810 and a storage unit 820. The CPU 810 stores program data relating to control operations of the system 10, and outputs a control signal corresponding to each detection signal to a predetermined operative element of the system 10 each time receiving the detection signal from the sensors 801 to 804.

The storage unit 820 stores data for determining each operation and detection signals from the sensors 801 to 804 on time basis, and updates contents of the detection signals at a predetermined time span.

In the embodiments, upon verifying that operation of the system 10 is initiated after a predetermined start-up operation, a time duration from a time when the CPU 810 determines that there does not exist a foamed article R3 in the mold space 34 based on a detection signal from the foamed article sensor 801 to a time when the CPU 810 determines that a foamed article R3 is produced in the mold space 34 based on a detection signal from the level sensor 802 is counted as one cycle. Cyclically repeating the predetermined operations of the system 10 produces foamed articles R3 one after another.

More specifically, upon termination of one cycle after verifying that the mold space 34 is vacant based on a detection signal from the foamed article sensor 801, the upper mold 32 is returned to the uppermost position (see FIG. 2A), the rotary valve unit 263, the first valve 235, the open/close valve unit 250, and the shut-off valve unit 210 are each set to a closed state, and the pressure chamber 26 and the resin supplying channel 33 are also shut off from outside.

Particularly, the pressure chamber 26 is constructed in such a manner that a back pressure to be exerted to the gas-dissolving-resin R2 in the pressure chamber 26 is set to a predetermined value that keeps carbon dioxide C from escaping from the resin R2 by control operation of the controller 800.

To accomplish the above back pressure control, the CPU 810 determines whether a back pressure inside the pressure chamber 26 (pressure which is exerted to the resin R2 in the pressure chamber 26 as the mixing screw 25 is moved forward) lies in a predetermined allowable range based on a detection signal from the back pressure sensor 803. In the case where the detected back pressure is out of the allowable range, the CPU 810 is controlled to output a certain control signal to the hydraulic cylinder 292 of the hydraulic driving mechanism 290.

It should be appreciated that in an actually operated system, a control signal from the controller 800 is temporarily output to the hydraulic unit 40, which in turn drives the hydraulic cylinder 292 by switching over hydraulic oil channels in the hydraulic unit 40. However, in the present specification, hydraulic control is described in such a manner that a control signal is directly output to a hydraulic component provided at a line end of the system to simplify the description.

Upon receiving a control signal, the hydraulic cylinder 292 is driven to move the mixing screw 25 forward and backward. Thereby, the gas-dissolving-resin R2 in the pressure chamber 26 is applied with a back pressure of a predetermined value. Thus, application of such a back pressure eliminates a likelihood that carbon dioxide C may be escaped from the resin R2 when the resin R2 is being supplied to the mold space 34.

Simultaneously, the resin supplying channel 33 of the lower mold is set to a closed state in which the upstream end thereof is closed by the open/close valve unit 250 and the downstream end thereof is closed by the shut-off valve unit 210, thereby securing a certain pressure therein. This arrangement eliminates a likelihood that carbon dioxide C may be escaped from the gas-dissolving-resin R2 while staying in the resin supplying channel 33.

The CPU 810 is designed to output a control signal to the heater member 24 so as to keep a temperature inside the pressure chamber 26 in a predetermined allowable range in the case where the CPU 810 determines that the temperature inside the pressure chamber 26 is out of the allowable range based on a detection signal from the temperature sensor 804. Such a feedback control enables to maintain the temperature inside the pressure chamber 26 within a certain temperature range.

Further, the CPU 810 determines whether a pressure inside the hopper 260 lies in a predetermined allowable range based on a detection signal from the pressure sensor 805. In the case where the CPU 810 determines that the pressure inside the hopper 260 is out of the predetermined allowable range, the CPU 810 outputs a control signal to the second valve 236 so as to close the second valve 236, whereby the pressure inside the hopper 260 is maintained in a certain pressure range.

Upon initiation of one cycle, the CPU 810 outputs a control signal to the elevating device 50 to lower the upper mold 32. Then, the elevating device 50 is driven to lower the upper mold 32 by a predetermined height (see FIG. 2B). Data concerning the height level is stored in the storage unit 820 in advance. The CPU 810 determines whether the upper mold 32 is lowered by the predetermined height based on a detection signal from the level sensor 802, and outputs a control signal to the elevating device 50 to suspend the lowering operation of the upper mold 32 upon detecting that the upper mold 32 has been lowered by the predetermined height.

Subsequently, the CPU 810 outputs a control signal to the shut-off valve unit 210 and the open/close valve unit 250 to open the respective units. Upon opening the shut-off valve unit 210 and the open/close valve unit 250, the gas-dissolving-resin R2 in the pressure chamber 26 is ready to be supplied into the mold space 34.

Next, the CPU 810 outputs a control signal to the hydraulic cylinder 292 to move the mixing screw 25 forward. Thereupon, the piston 296 protrudes to move the mixing screw 25 forward, thereby supplying the gas-dissolving-resin R2 in the pressure chamber 26 into the mold space 34 via the open/close valve unit 250, the resin supplying channel 33, and the shut-off valve unit 210 (see FIG. 2C). The supplying amount of the resin R2 to be supplied to the mold space 34 is regulated by the protruding amount of the mixing screw 25.

In the embodiments, the CPU 810 prohibits the mixing screw 25 from moving backward and keeps on verifying whether the gas-dissolving-resin R2 in the pressure chamber 26 retains its predetermined pressure based on a detection signal from the back pressure sensor 803 for a time duration after completing drawing operation of a predetermined volume of resin R2 into the mold space 34 by forward movement of the mixing screw 25 up to a time when the raw material synthetic resin R1 in the hopper 260 is started to be supplied into the pressure chamber 26 upon driving of the rotary valve unit 263. If the CPU 801 judges that the predetermined pressure in the pressure chamber 26 is not maintained, the CPU 810 outputs a control signal to the hydraulic cylinder 292 to move the mixing screw 25 forward. Thereby, the gas-dissolving-resin R2 in the pressure chamber 26 is securely applied with a predetermined back pressure.

The above arrangement is made to eliminate the following drawback. In the case where the resin R2 in the pressure chamber 26 is extruded out therefrom by forward movement of the mixing screw 25, the resin R2 in the pressure chamber 26 is moved dynamically and rendered into an unstable condition with the result that part of the carbon dioxide C which has been once dissolved in the resin R2 may be escaped therefrom.

After a certain volume of gas-dissolving-resin R2 is loaded in the mold space 34, the CPU 810 outputs a control signal to close the shut-off valve unit 210 and the open/close valve unit 250 to render the resin supplying channel 33 into a sealed state. Subsequently, the CPU 810 outputs a control signal to the rotary valve unit 263 to drive the rotary valve unit 263. Simultaneously, the CPU 810 outputs a control signal to the first valve 235 to open the first valve 235 so as to draw carbon dioxide C from the gas cylinder 23 into the pressure chamber 26.

As a raw material synthetic resin R1 is supplied into the pressure chamber 26 by driving the rotary valve unit 263 and the mixing screw 25 for plasticization, the resin R1 is turned into a gas-dissolving-resin R2 in the pressure chamber 26 and is successively loaded into the mold space 34. At this time, the CPU 810 verifies a detection signal from the back pressure sensor 803 periodically, and outputs a control signal instantaneously to the hydraulic cylinder 292, for example, in the case where the detection signal indicates that a detected back pressure is lower than a predetermined value. The hydraulic cylinder 292 then is operated to raise a back pressure in the pressure chamber 26 based on the control signal to set a pressure exerted to the gas-dissolving-resin R2 in the pressure chamber 26 at a constant value.

In the case where the CPU 810 judges that a predetermined volume of raw material synthetic resin R1 has been loaded in the pressure chamber 26 based on time control, the CPU 810 controls the screw driving motor 291 to keep on driving for a predetermined time period to allow the mixing screw 25 to knead the gas-dissolving-resin R2 in the pressure chamber 25. Kneading operation by rotation of the mixing screw 25 enables to dissolve the carbon dioxide C into the resin R1 while melting and fluidizing the raw material synthetic resin R1 in the pressure chamber 26 which is kept at a certain temperature and a certain pressure. Thereby, a gas-dissolving-resin R2 is prepared in the pressure chamber 26 to be ready for molding, which is implemented in a next step.

After completing supplying of the gas-dissolving-resin R2 into the mold space 34, the CPU 810 outputs a control signal to the elevating device 50 to raise the upper mold 32. Thereby, a foamed article R3 is produced in the mold space 34 (control operations shown in FIGS. 2A to 5).

After producing the foamed article R3 in the mold space 34 (see FIG. 2D), the CPU 810 outputs a control signal to the elevating device 50 to raise the upper mold 32 to the uppermost position. Thus, one cycle of molding operation by the system 10 is terminated. The aforementioned control is cyclically repeated to automatically produce foamed articles R3 one after another.

It should be appreciated that molded articles R4 can be produced by the first production method shown in FIGS. 2A to 3, or the second production method shown in FIGS. 4A to 5 with use of the system in accordance with the third embodiment.

As mentioned above, the system 10 in the third embodiment has an arrangement that the raw material hopper 260 is rendered into an air-tight state by providing the cover member 262 and the rotary valve unit 263, and carbon oxide C of a certain pressure is supplied from the gas cylinder 23 into the hopper main body 261. In this arrangement, loading the raw material synthetic resin R1 into the hopper main body 261 by opening the cover member 262, rendering the hopper main body 261 into an air-tight state by closing the cover member 262, and supplying carbon dioxide C into the hopper 260 in the air-tight state enables to establish a pressurized and atmospheric state inside the hopper 260 (namely, a supercritical state for carbon dioxide). In the case where a gas-dissolving-resin R2 obtained by dissolving carbon dioxide C in a raw material synthetic resin R1 is directly loaded in the hopper 260 in the above arrangement, there is no likelihood that the carbon dioxide C in a resin R2 may be escaped therefrom since the hopper 260 is set to an air-tight state.

The raw material synthetic resin R1 which has been supplied under the aforementioned atmospheric condition is rendered into a state where part of the carbon dioxide C is impregnated and diffused inside the resin R1 before being introduced into the pressure chamber 26 of the extrusion cylinder 21. Accordingly, by the time when the resin R1 is loaded into the extrusion cylinder 21, part of the carbon dioxide C in the resin R1 has already been dissolved therein. This arrangement shortens a processing time for impregnating carbon dioxide C into the resin R1 in the pressure chamber 26. Thereby, preparing efficiency of gas-dissolving-resin R2 in the pressure chamber 26 is raised, and productivity of foamed article R3 is raised.

The extrusion cylinder 21 for receiving the raw material synthetic resin R1 from the hopper 260 includes the mixing screw 25 which is rotatable about an axis thereof inside the pressure chamber 26. In this arrangement, supplying the raw material synthetic resin R1 from the hopper 260 and supplying the carbon dioxide C from the gas cylinder 23 and introducing both of the ingredients to the pressure chamber 26 which has been set to an environment which establishes a supercritical state for carbon dioxide at a certain temperature and a certain pressure enables to efficiently dissolve the carbon dioxide C in the resin R1 aided by an increased outer surface area of the raw material synthetic resin R1 due to agitation by the spiral blade 25b and to facilitate diffusion of the carbon dioxide C in the resin R1. Thereby, the gas-dissolving-resin R2 can be efficiently produced, aided by impregnation of carbon dioxide C into the resin R1 which has been carried out inside the hopper 260 before being supplied to the pressure chamber 26.

As mentioned above, the cover member 262 is sealably mounted on the upper opening of the hopper 260 by a bolt and fastening means, and the rotary valve unit 263 serving as raw material supplying means is provided at the bottom portion of the hopper main body 261. This arrangement enables to simplify the sealing construction of the hopper 260 and provides a securely sealable state thereof. Further, the rotary valve unit 263 is so constructed as to supply the resin R1 into the extrusion cylinder 21 while securing an air-tightness thereof. This arrangement eliminates a draw back that an air-tight state of the rotary valve unit 263 may be released during supplying operation thereof which may lead to escape of carbon dioxide C once dissolved in the resin R1.

In the embodiment, carbon dioxide C in the gas cylinder 23 is selectively supplied to the pressure chamber 26 and/or the hopper 260 by manipulating the first valve 235 and the second valve 236. Further, in the case where carbon dioxide C is supplied to both of the pressure chamber 26 and the hopper 260, supply amounts of carbon dioxide C thereto can be optimally regulated by controlling respective openings of the first valve 235 and the second valve 236. In this arrangement, distributed amount of carbon dioxide C to the pressure chamber 26 and the hopper 260 can be optimally set considering the kind of raw material synthetic resin R1, size (dimensions) and operating status of the system 10, etc. to produce a gas-dissolving-resin R2 into a supermicrocellular foamed article. Namely, this arrangement provides flexibility in operating the system 10 depending on a variety of conditions.

The system 10 is constructed in such a manner that a control signal is output from the controller 800 to the hydraulic cylinder 292 to set a back pressure in the preparing apparatus 20 at a predetermined value so as to prevent carbon dioxide C from separating from the gas-dissolving-resin R2 in a state that drawing of the gas-dissolving-resin R2 from the preparing apparatus 20 into the mold space 34 of the molding apparatus 30 is prohibited. In this arrangement, as far as the resin R2 is kept from drawing from the preparing apparatus 20 into the mold space 34 of the molding apparatus 30, specifically, for a stand-by period immediately after the resin R2 is supplied from the preparing apparatus 20 to the mold space 34 of the molding apparatus 30 by driving of the hydraulic cylinder 292 to a molding operation which follows the drawing operation, the back pressure in the preparing apparatus 20 is set to a predetermined value by driving the hydraulic cylinder 292 based on a control signal from the controller 800. This arrangement securely eliminates a drawback that carbon dioxide C may be escaped from the resin R2 which stays in the preparing apparatus 20 after the resin R2 is supplied to the molding apparatus 30. Thereby, a molded article made of a supermicrocellular foamed article R3 can be easily produced.

In the above embodiments, the open/close valve unit 250 and the shut-off valve unit 210 are respectively provided at the upstream and downstream ends of the resin supplying channel 33 of the lower mold 31 along which the resin R2 is supplied from the preparing apparatus 20 into the mold space 34. In this arrangement, closing the shut-off valve unit 210 and the open/close valve unit 250 enables to maintain an air-tight state of the pressure chamber 26 with ease. Furthermore, driving the hydraulic cylinder 292 to move the mixing screw 25 enables to apply a back pressure to the resin R2 properly. This arrangement eliminates a likelihood that the carbon dioxide C may be escaped from the resin R2.

Figure 16:
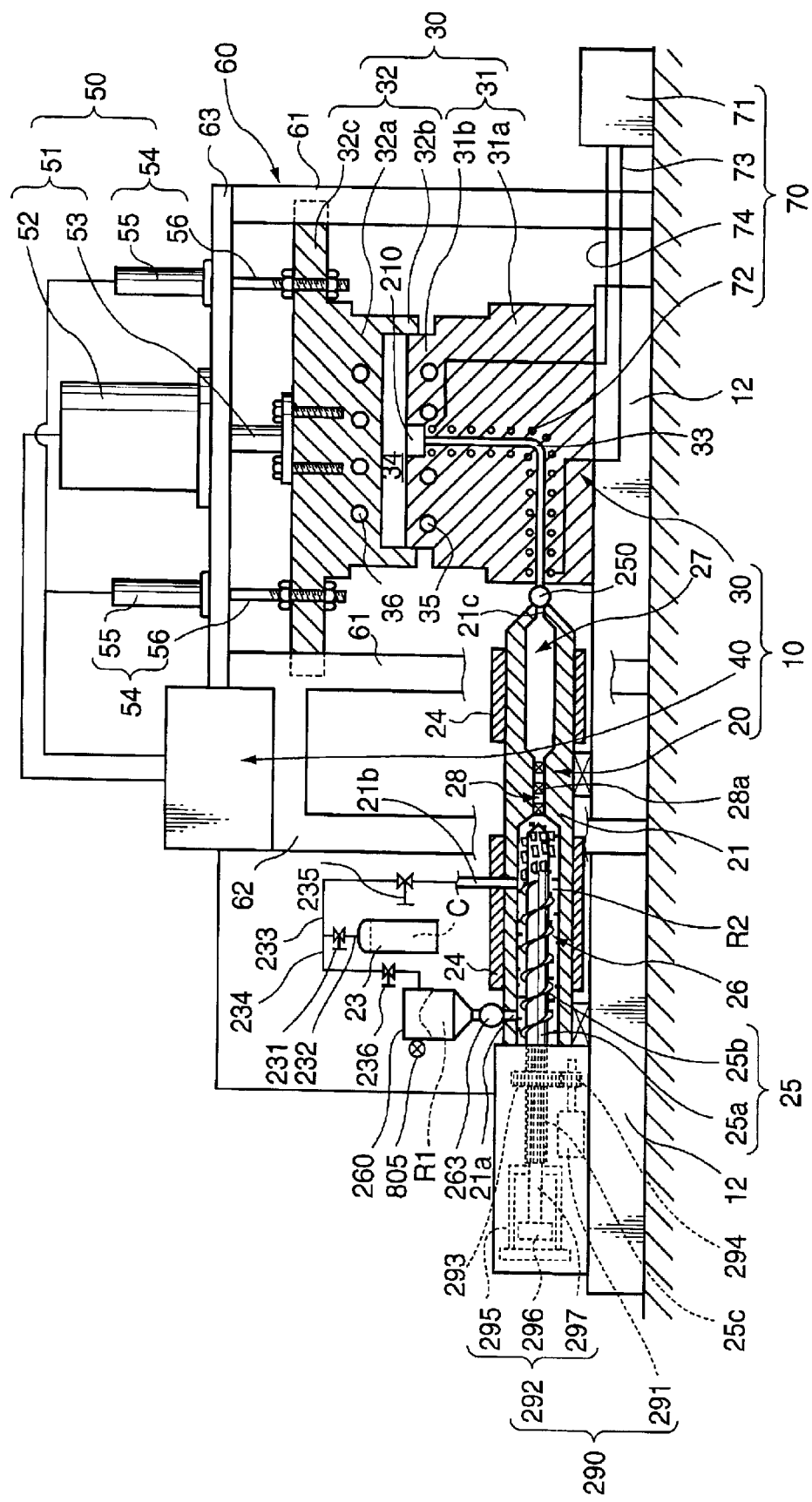
FIG. 16 is a sectional side view of a modified preparing apparatus in the foamed article producing system shown in FIG. 12.

A modification of the extrusion cylinder 21 in the third embodiment is described with reference to FIG. 16. It should be noted that elements in the modification which are identical to those in the third embodiment are denoted at the same reference numerals. In the modification, preferably, the extrusion cylinder 21 may be divided into two sections by a neck passage 28. A pressure chamber 26 is defined at an upstream side in a material extruding direction with respect to the neck passage 28, and a diffusing chamber 27 is defined at a downstream side with respect to the neck passage 28 in such a manner that diffusion of carbon dioxide C in a gas-dissolving-resin R2 is accelerated while the resin R2 stays in the diffusing chamber 27. The arrangement of the neck passage 28, the diffusing chamber 27, and a mixing element or elements 28a in the neck passage 28 is the same as shown in FIG. 16.

The present invention is not limited to the aforementioned embodiments, and the following modifications and alterations may be applicable.

(1) In the embodiments, carbon dioxide is used as a gas which is to be dissolved in the raw material synthetic resin R1 for generating cell nucleators. Alternatively, the gas may be a nitrogen gas or a carbon monoxide.

(2) In the embodiments, the environment relating to a temperature and a pressure inside the pressure chamber 26 of the foamed article preparing apparatus 20 is so set as to establish a supercritical state for carbon dioxide C. This invention is not limited to the aforementioned arrangement. As far as an environment attains a certain temperature and a certain pressure even if the environment fails to establish a supercritical state for a gas for generating cell nucleators depending on the kind of raw material synthetic resin R1 and operating status of the system 10, it is possible to dissolve the gas into the resin R1.

(3) In the embodiments, rotation of the mixing screw 25 and upward and downward movement of the elevating device 50 are controlled by a pressure of hydraulic oil which is supplied from the hydraulic unit 40. A driving method with use of an electric motor may be applicable in place of the driving method with use of the hydraulic mechanism.

(4) In the embodiments, the lower mold 31 is a male mold, and the upper mold 32 is a female mold. Alternatively, the lower mold 31 may be a female mold, and the upper mold 32 may be a male mold.

(5) In the embodiments, it may be preferable to provide a sealing member at an appropriate position of the molding apparatus 30 to enhance air-tightness of the mold space 34.

(6) In the second embodiment shown in FIG. 7 and the third embodiment shown in FIG. 11, the gas-dissolving-resin R2 staying in the resin supplying channel 33 of the lower mold 31 is kept in a molten state by heating the heater member 72 by power supply from the power source unit 71. Alternatively, the resin R2 may be heated by heat exchange with heated oil, heated water, or heated gas.

(7) In the embodiment shown in FIGS. 8A and 8B, the shut-off valve unit 210 includes the cylinder device 214 equipped with the link arm 213, the needle valve 212 which is moved forward against a biasing force of the coil spring 221 by driving the cylinder device 214 to close the eject port 240, the inner member 211 which encases the cylinder device 214, the link arm 213, the coil spring 221, and the needle valve 212 therein, and the casing 230 which is fitted in the downstream end of the resin supplying channel 33 in a state that the inner member 211 is mounted therein. Alternatively, this invention may adopt an arrangement other than the aforementioned shut-off valve unit 210.

For instance, there may be provided an arrangement in which a casing 230 (hereinafter, for easier explanation, elements in an altered arrangement which correspond to those in the embodiments are denoted at the same reference numerals), a needle valve 212 which is mounted in the casing 230, and a cylinder device 214 which is arranged at a rear end (lower end in FIGS. 8A and 8B) of the needle valve 212 in serial manner constitute a shut-off valve unit 210. In this altered arrangement, the needle valve 212 is directly pressed by forward movement of a piston rod 223 by driving a cylinder 222 against a biasing force of a coil spring 221 without providing a link arm 213, whereby an eject port 240 is closed. This arrangement enables to securely shut off a resin supplying channel 33 and a mold space 34 from outside while simplifying the construction of the shut-off valve unit 210.

(8) In the embodiment shown in FIG. 11, the first sub pipe 233 is provided between the gas cylinder 23 and the extrusion cylinder 21 to supply carbon dioxide C to the pressure chamber 26 in which a raw material synthetic resin R1 supplied from the hopper 260 is turned into a gas-dissolving-resin R2. Alternatively, in the case where an operative condition is providable in which carbon dioxide C is securely dissolved in the raw material synthetic resin R1 inside the hopper 260, it is not required to supply carbon dioxide C to the gas-dissolving-resin R2 in the pressure chamber 26.

(9) In the embodiment shown in FIG. 11, the raw material synthetic resin R1 which has not been impregnated with carbon dioxide C is loaded into the hopper 260. Alternatively, an additional device other than the foamed article producing system 10 may be provided to completely dissolve carbon dioxide C in a resin R1 therein so as to load a resin completely dissolved with the carbon dioxide C to a hopper main body. In this altered arrangement, it is not required to impregnate carbon dioxide C in the raw material synthetic resin R1 in the hopper. This altered arrangement enables to satisfy an urgent demand for continuous production. Further, since the hopper main body has an air-tight structure, there is no likelihood that carbon dioxide C may be escaped from the raw material synthetic resin loaded in the hopper main body.

(10) In the embodiment shown in FIG. 11, the rotary valve 263 as raw material supplying means is provided to supply the raw material synthetic resin R1 from the hopper main body 261 into the pressure chamber 26 of the extrusion cylinder 21. Alternatively, there may be provided a valve arrangement using a piston member in which a piston member formed with a recessed portion along a circumference thereof to receive the resin R1 therein is made movable in sliding contact with a cylinder device in an axial direction thereof.

There may be provided a further altered arrangement stated as below. A known open/close valve is provided at each of upper and lower ends of a raw material supplying pipe 264 to define an air-tight chamber between the upper-located and lower-located valves. First, the upper-located valve is opened to temporarily draw a resin R1 into the air-tight chamber, and then is set to a closed state. Subsequently, the lower-located valve is opened to supply the resin R1 in the air-tight chamber to a pressure chamber 26, and then is set to a closed state. These operations are cyclically repeated to supply the resin R1 to the pressure chamber 26 while maintaining air-tight state of a hopper main body 261.

(11) In the embodiment shown in FIG. 11, carbon dioxide C is dissolved in the resin R1 in the hopper 260. Alternatively, a hopper may be set to an opened state, and carbon dioxide C may not be dissolved in a resin R1 inside a hopper although this altered arrangement requires sufficient dissolving operation of carbon dioxide C in the resin R1 in the pressure chamber 26.

As described above, an inventive foamed article production system comprises a preparing apparatus which prepares a molten gas-dissolving-resin having a great number of cell nucleators by diffusing a gas in a synthetic resin in a molten state under conditions of a predetermined temperature and a predetermined pressure; and a molding apparatus which foams and molds the gas-dissolving-resin supplied from the preparing apparatus into a foamed article having a great number of cells, the molding apparatus including at least two mold members which define a mold space and are movable relative to each other.

The preparing apparatus may be preferably provided with a pressure chamber for containing the synthetic resin and the gas, and a mixing screw for mixing the synthetic resin with the gas to form the gas-dissolving-resin having a great number of cell nucleators. The preparing apparatus may be further provided with a moving mechanism for moving the mixing screw in an axial direction.

The preparing apparatus may be preferably provided with a resin pressure mechanism for applying a back pressure to the gas-dissolving-resin in a downstream direction, and a controller for controlling the resin pressure mechanism to apply a predetermined back pressure to the gas-dissolving-resin during a period of time from completion of a supply of the gas-dissolving-resin to start of a next supply of the gas-dissolving-resin.

The pressure chamber may be preferably provided with a shut-off-valve unit at one or both of an upstream end and a downstream end thereof to keep the pressure chamber in an air-tight state.

It may be preferable to use one selected from the group consisting of carbon dioxide, nitrogen gas, and carbon monoxide.

Preferably, there may be further provided a raw material hopper for supplying a raw material synthetic resin to the preparing apparatus. The raw material hopper includes a cover member closably mounted on an upper portion of the hopper to render the hopper into a sealable state, and a raw material supplier provided at a bottom portion of the hopper for supplying the raw material synthetic resin into the preparing apparatus while retaining an air-tight state of the preparing apparatus.

The molding apparatus may be preferably provided with a male mold, a female mold fittingly engageable with the male mold, and a moving mechanism for moving one or both of the male mold and the female mold.

The molding apparatus may be preferably provided with a mold member defining a part of a mold space for molding the gas-dissolving-resin. The mold member is provided with a resin supplying channel for supplying the gas-dissolving-resin into the mold space, a heater for maintaining the gas-dissolving-resin in the resin supplying channel in a molten state, and a valve arranged in the resin supplying channel at a position facing the mold space.

The molding apparatus may be preferably provided with a mold member including a plurality of resin supplying channels, and a valve arranged in each of the plurality of resin supplying channels.

The molding apparatus may be preferably provided with a mold member including a resin supplying channel for supplying the gas-dissolving-resin into the mold space, and a shut-off-valve unit at a downstream end of the resin supplying channel.

The molding apparatus is adapted for compression molding, and includes a female mold formed with a recessed portion for constituting a mold space, a male mold which is slidingly fitted in the recessed portion of the female mold, and a pressing mechanism which pressingly moves one or both of the female mold and the male mold toward each other. A material for molding is loaded in the mold space before or in a state that the male mold id fitted in the recessed portion of the female mold. Then, reducing the pressure in the mold space by driving the pressing mechanism to move the female mold and the male mold toward each other enables to mold the material into a foamed article.

The molding apparatus has an arrangement adapted for compression molding. For instance, a female mold fittingly covers a male mold fixed on a floor and a mold space is defined by the bottom surface of the female mold and the top surface of the male mold with its capacity set variable. In this arrangement, the capacity of the mold space is set minimal by lowering the female mold to a lowermost position in an initial stage of molding, and the female mold is gradually raised as the gas-dissolving-resin is injected from the molten resin preparing apparatus into the mold space. Controlling the raising rate of the upper mold enables to regulate the pressure to be exerted to the gas-dissolving-resin supplied into the mold space.

In the case where a mold for injection molding with an effective capacity of a mold space set invariable is used, it is required to regulate the pressure in the mold space by supplying a pressurized gas from an additionally-provided pressure regulator into the mold space and by manipulating a valve. Pressure control by manipulating the valve is extremely difficult, and there cannot be avoided a drawback that quality of molded articles which are resultantly produced is varied due to variation of pressure. However, the inventive molding apparatus easily attains a desirable pressure to be exerted to a gas-dissolving-resin in the mold space by simply moving the female mold (or male mold) upward and downward according to a predetermined operation. Thereby, there is no likelihood that quality of molded articles varies. In addition, the inventive molding apparatus does not require a pressure regulator in the vicinity of a molding apparatus, which contributes to reduction of an installation cost.

This application is based on patent application Nos. 2000-376890, 2000-376891, and 2000-381506 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A foamed article producing system comprising:
   a preparing apparatus which prepares a molten gas-dissolving-resin having a great number of cell nucleators by diffusing a gas in a synthetic resin in a molten state under conditions of a predetermined temperature and a predetermined pressure; and
   a molding apparatus which foams and molds the gas-dissolving-resin supplied from the preparing apparatus into a foamed article having a great number of cells, the molding apparatus including at least two mold members which define a mold space therebetween and are movable relative to each other, said mold space being expandable when said gas-dissolving resin is being foamed; and
   a controller for controlling a mold driving mechanism to move at least one of the mold members to increase the mold space in response to a signal after the molten gas-dissolving-resin is filled in the mold space.

2. The system according to claim 1, wherein the preparing apparatus includes:
   a pressure chamber for containing the synthetic resin and the gas; and
   a mixing screw for mixing the synthetic resin with the gas to form the gas-dissolving-resin having a great number of cell nucleators.

3. The system according to claim 2, wherein the pressure chamber is provided with a shut-off-valve unit at one or both of an upstream end and a downstream end thereof to keep the pressure chamber in an air-tight state.

4. The system according to claim 2, wherein the preparing apparatus further includes a moving mechanism for moving the mixing screw in an axial direction.

5. The system according to claim 1, wherein the preparing apparatus includes:
   a resin pressure mechanism for applying a back pressure to the gas-dissolving-resin in a downstream direction; and
   a controller for controlling the resin pressure mechanism to apply a predetermined back pressure to the gas-dissolving-resin during a period of time from completion of a supply of the gas-dissolving-resin to start of a next supply of the gas-dissolving-resin.

6. The system according to claim 5, wherein the molding apparatus includes a mold member provided with:
   a resin supplying channel for supplying the gas-dissolving-resin into the mold space; and
   a shut-off-valve unit at a downstream end of the resin supplying channel.

7. The system according to claim 1, wherein the mold members include:
   a male mold;
   a female mold fittingly engageable with the male mold; and
   a moving mechanism for moving one or both of the male mold and the female mold.

8. The system according to claim 1, wherein one of mold members is provided with:
   a resin supplying channel for supplying the gas-dissolving-resin into the mold space;
   a heater for maintaining the gas-dissolving-resin in the resin supplying channel in a molten state; and
   a valve arranged in the resin supplying channel at a position facing the mold space.

9. The system according to claim 1, wherein one of the mold members is provided with a plurality of resin supplying channels, and a valve arranged in each of the plurality of resin supplying channels.

10. The system according to claim 1, wherein the gas includes one selected from the group consisting of carbon dioxide, nitrogen gas, and carbon monoxide.

11. The system according to claim 1, further comprising a raw material hopper for supplying a raw material synthetic resin to the preparing apparatus, the raw material hopper including:
    a cover member closably mounted on an upper portion of the hopper to render the hopper into a sealable state; and
    a raw material supplier provided at a bottom portion of the hopper for supplying the raw material synthetic resin into the preparing apparatus while retaining an air-tight state of the preparing apparatus.

12. A molten resin preparing apparatus adapted for use in a foamed article production system, said molten resin preparing apparatus comprising:
    a pressure chamber for containing the synthetic resin and the gas;
    a mixing screw for mixing the synthetic resin with the gas to form the gas-dissolving-resin having a great number of cell nucleators; and
    a resin pressure mechanism for applying a back pressure to the gas-dissolving-resin in a downstream direction.

13. The molten resin preparing apparatus according to claim 12, wherein the pressure chamber is provided with a shut-off-valve unit at one or both of an upstream end and a downstream end thereof to keep the pressure chamber in an air-tight state.

14. The molten resin preparing apparatus according to claim 12, further comprising a controller for controlling the resin pressure mechanism to apply a predetermined back pressure to the gas-dissolving-resin during a period of time from completion of a supply of the gas-dissolving-resin to start of a next supply of the gas-dissolving-resin.

15. The molten resin preparing apparatus according to claim 12, wherein the resin pressure mechanism includes a moving mechanism for moving the mixing screw in an axial direction.

16. A molding apparatus for use in a foamed article production system, comprising:
    a male mold;
    a female mold fittingly engageable with the male mold;
    a moving mechanism for moving one or both of the male mold and the female mold for changing a mold space defined between the male mold end the female mold when a molten gas-dissolving-resin having a great number of cell nucleators is being supplied to said mold space; and a controller for controlling a mold driving mechanism to move at least one of the mold members to increase the mold space in response to a signal after the molten gas-dissolving-resin is filled in the mold space.

17. The molding apparatus according to claim 16, wherein one of the male mold and the female mold is provided with:
- a resin supplying channel for supplying the gas-dissolving-resin into the mold space;
- a heater for maintaining the gas-dissolving-resin in the resin supplying channel in a molten state; and
- a valve arranged in the resin supplying channel at a position facing the mold space.

18. The molding apparatus according to claim 16, wherein one of the male mold and the female mold is provided with a plurality of resin supplying channels, and a valve arranged in each of the plurality of resin supplying channels.

19. The molding apparatus according to claim 16, wherein one of the male mold and the female mold is provided with:
- a resin supplying channel for supplying the gas-dissolving-resin into the mold space; and
- a shut-off-valve unit at a downstream end of the resin supplying channel.

20. A system adapted for the production of a foamed article comprising:
- a preparing apparatus for preparing a molten gas-dissolving-resin having a great number of cell nucleators by diffusing a gas in a synthetic resin that is in a molten state under conditions of a predetermined temperature and a predetermined pressure;
- a raw material hopper for supplying a raw material synthetic resin to said preparing apparatus, said raw material hopper including a cover member closably mounted on an upper portion of the hopper to render the hopper into a sealable state;
- a raw material supplier provided at a bottom portion of said hopper for supplying the raw material synthetic resin into said preparing apparatus while the preparing apparatus is retained in an air-tight state;
- a molding apparatus for foaming and molding the gas-dissolving-resin supplied from the preparing apparatus into a foamed article having a great number of cells, the molding apparatus including at least two mold members which define a mold space therebetween and are movable relative to each other, wherein one of mold members is provided with a ream supplying channel for supplying the gas-dissolving-resin into the mold space, a heater for maintaining the gas-dissolving-resin in the resin supplying channel in a molten state, and a valve arranged in the resin supplying channel at a position facing the mold space; and a controller for controlling a mold driving mechanism to move at least one of the mold members to increase the mold space in response to the molten gas-dissolving-resin filling in the mold space.

* * * * *